(12) United States Patent
Takiguchi et al.

(10) Patent No.: US 11,496,893 B2
(45) Date of Patent: Nov. 8, 2022

(54) SECURE COMPUTATION SYSTEM AND RELAY DEVICE, AND METHOD, PROGRAM, AND RECORDING MEDIUM THEREOF

(71) Applicant: NIPPON TELEGRAPH AND TELEPHONE CORPORATION, Chiyoda-ku (JP)

(72) Inventors: Hiroyoshi Takiguchi, Musashino (JP); Naoto Kiribuchi, Musashino (JP); Teruko Miyata, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 315 days.

(21) Appl. No.: 15/516,319

(22) PCT Filed: Oct. 2, 2015

(86) PCT No.: PCT/JP2015/078009
§ 371 (c)(1),
(2) Date: Mar. 31, 2017

(87) PCT Pub. No.: WO2016/056473
PCT Pub. Date: Apr. 14, 2016

(65) Prior Publication Data
US 2017/0310473 A1    Oct. 26, 2017

(30) Foreign Application Priority Data

Oct. 7, 2014  (JP) .............................. JP2014-206357

(51) Int. Cl.
*H04L 29/06* (2006.01)
*H04W 12/0433* (2021.01)
(Continued)

(52) U.S. Cl.
CPC ........ *H04W 12/0433* (2021.01); *G06F 21/60* (2013.01); *G09C 1/00* (2013.01);
(Continued)

(58) Field of Classification Search
CPC ..... H04L 9/085; H04L 63/0464; H04L 63/06; G06F 21/60; G09C 1/00; H04W 12/04
See application file for complete search history.

(56) References Cited

U.S. PATENT DOCUMENTS 6,643,701 B1   11/2003  Aziz et al.
9,424,326 B2*   8/2016  Baptist ................. G06F 16/178
(Continued)

FOREIGN PATENT DOCUMENTS

CN   101420427 A   4/2009
CN   104012028 A   8/2014
(Continued)

OTHER PUBLICATIONS

Japanese Office Action dated Sep. 5, 2017 in Patent Application No. 2016-553076 (with English Translation).
(Continued)

*Primary Examiner* — Fatoumata Traore
*Assistant Examiner* — Carlton Johnson
(74) *Attorney, Agent, or Firm* — Oblon, McClelland, Maier & Neustadt, L.L.P.

(57) ABSTRACT

A relay device transfers a plurality of original data fragments corresponding to a plurality of secret sharing values of original data to a plurality of secure computation devices, transfers, to each of the secure computation devices, a request to send a result fragment based on a secure computation result corresponding to any one of the original data fragments, and transfers the result fragment. The relay device controls timing with which the original data fragments are transferred and timing with which the request to send is transferred.

13 Claims, 12 Drawing Sheets

(51) Int. Cl.
*G09C 1/00* (2006.01)
*G06F 21/60* (2013.01)
*H04L 9/08* (2006.01)
*H04L 9/40* (2022.01)

(52) U.S. Cl.
CPC .......... *H04L 9/085* (2013.01); *H04L 63/0464* (2013.01); *H04L 63/06* (2013.01)

(56) References Cited

U.S. PATENT DOCUMENTS

| 9,606,858 | B2* | 3/2017 | Resch | G06F 11/10 |
| 2002/0164033 | A1* | 11/2002 | Rajasekaran | H04L 9/085 |
| | | | | 380/278 |
| 2010/0037056 | A1* | 2/2010 | Follis | G06F 11/1464 |
| | | | | 713/168 |

FOREIGN PATENT DOCUMENTS

| JP | 2003-345679 A | 12/2003 |
| JP | 2013-26954 A | 2/2013 |

OTHER PUBLICATIONS

International Search Report dated Dec. 22, 2015, in PCT/JP2015/078009 filed Oct. 2, 2015.
Chida et al., "Secure Computation Technology available for secure secondary use of highly-confidential data", NTT Gijutu Journal, vol. 26, No. 3, (Mar. 1, 2014), pp. 67-70, with corresponding English-language version, Chida et al., "R&D on Secure Computation Technology for Privacy Protection" NTT Technical Review, vol. 12, No. 7, (Jul. 2014), 10 pages.
Kitagami et al., "A Proxy Communication Method in Machine to Machine System to Enable the Device Connection to Different Multiple Services and its Implementation", IEEJ Transactions on Electronics, Information and Systems, vol. 132, No. 4, (Apr. 1, 2012), 12 pages.
Shamir, "How to Share a Secret", Communications of the ACM, vol. 22, Issue 11, (1979), pp. 612-613.
Chida et al., "A Three-Party Secure Function Evaluation with Lightweight Verifiability Revisited", Computer Security Symposium, (2010), 6 pages.
Chida et al., "A Secure Matching Protocol with Statistical Disclosure Control", IPSJ SIG Technical Report, 2011-CSEC-52(12), (2011), 6 pages.
Hamada et al., "A Linear Time Sorting Algorithm on Secure Function Evaluation", Computer Security Symposium, (2011), with corresponding English-language version, Hamada et al., "Oblivious Radix Sort: An Efficient Sorting Algorithm for Practical Secure Multi-party Computation", 26 pages.
Extended European Search Report dated Jan. 11, 2018 in Patent Application No. 15848792.6, 8 pages.
Anna Lysyanskaya, et al. "Rational Secret Sharing with Side Information in Point-to-Point Networks via Time-Delayed Encryption", International Association for Cryptologic Research, vol. 20101025:151021, XP061004288, 2010, pp. 1-24.

* cited by examiner

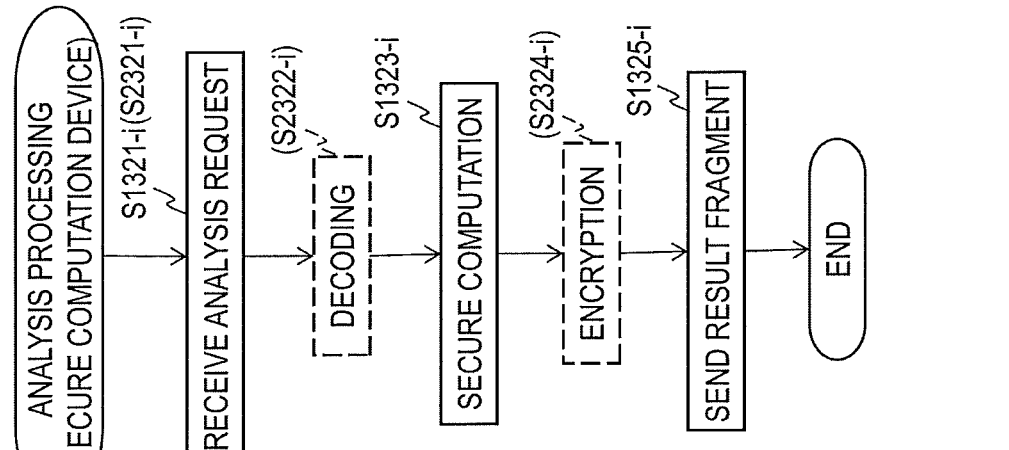
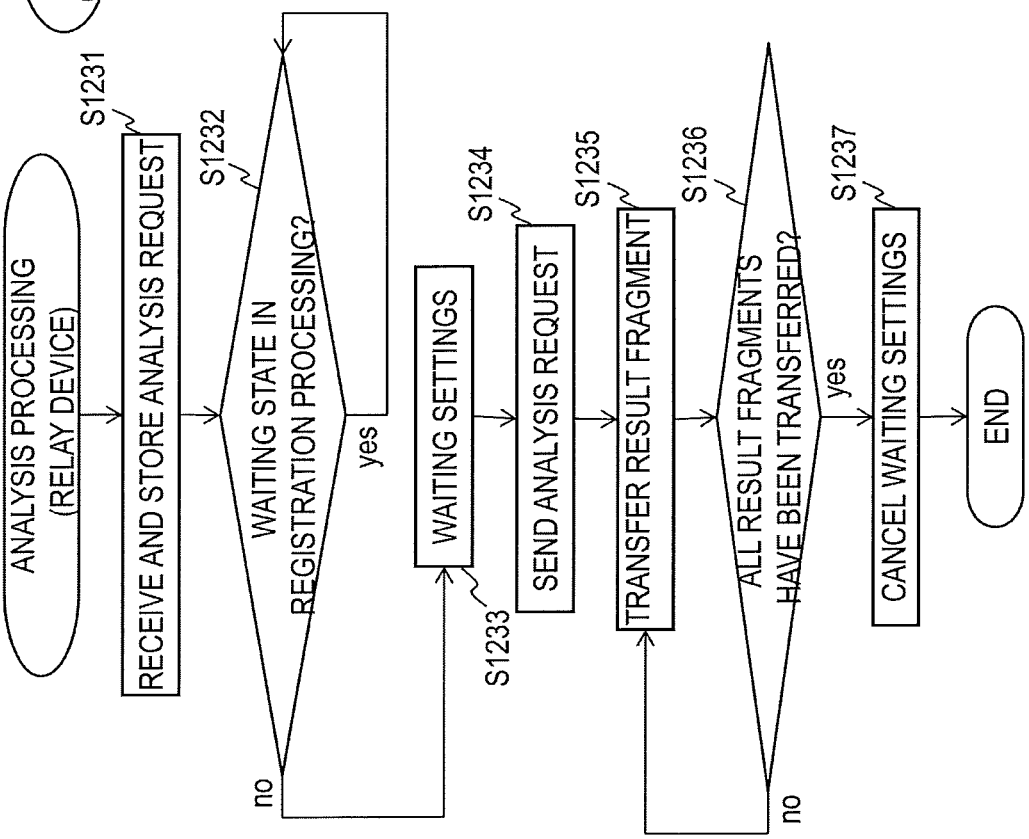
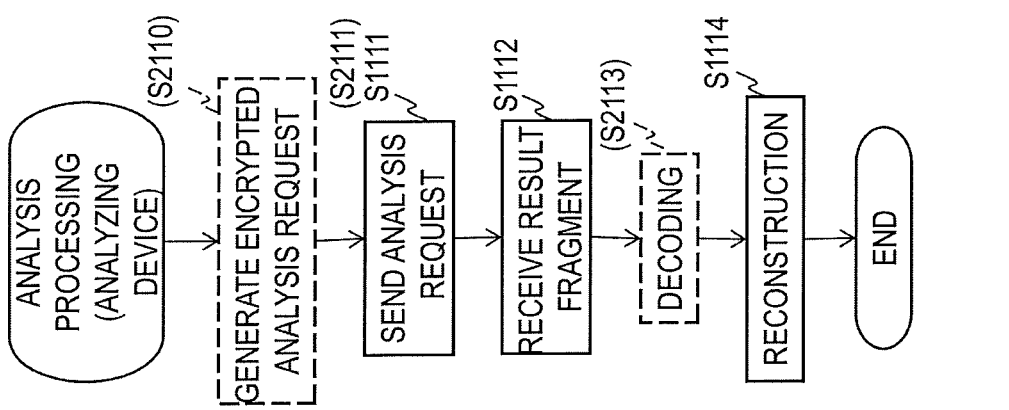

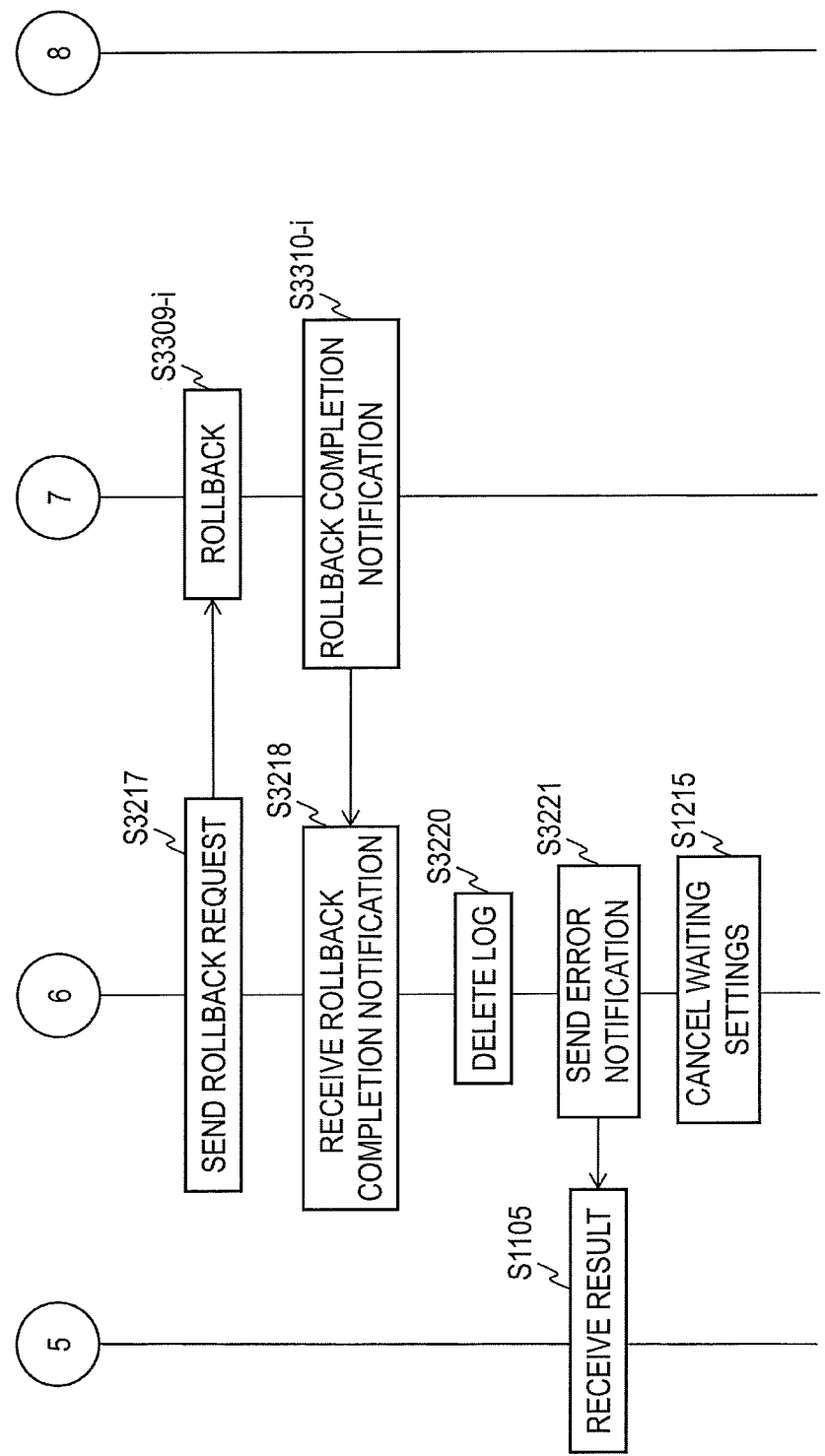

SECURE COMPUTATION SYSTEM AND RELAY DEVICE, AND METHOD, PROGRAM, AND RECORDING MEDIUM THEREOF

TECHNICAL FIELD

The present invention relates to a cryptography applied technology and, in particular, relates to a secure computation technology.

BACKGROUND ART

In the existing secure computation technology (see, for example, Non-patent Literature 1 and so forth), a data holder sends a plurality of fragments obtained by performing secret sharing on original data to a plurality of secure computation devices, the secure computation devices each execute processing by secure computation in a concealed state in response to an analysis request from an analyzer, and the analyzer obtains an analysis result by using responses from the plurality of secure computation devices.

PRIOR ART LITERATURE

Non-Patent Literature

Non-patent Literature 1: Koji Chida, Dai Ikarashi, Teruko Miyata, Hiroyoshi Takiguchi, Naoto Kiribuchi, "Secure Computation Technology available for secure secondary use of highly-confidential data", NTT GIJUTU Journal, 2014, pp. 67-70.

SUMMARY OF THE INVENTION

Problems to be Solved by the Invention

However, in the existing secure computation technology, depending on the start timing of sending of fragments or sending of an analysis request, a mismatch may occur in the order of arrival of the fragments or analysis request between the secure computation devices, resulting in an incorrect analysis result.

The present invention has been made in view of such a problem and provides a technology that can obtain a correct analysis result irrespective of the processing start timing.

Means to Solve the Problems

A relay device is provided which transfers a plurality of original data fragments corresponding to a plurality of secret sharing values of original data to a plurality of secure computation devices, transfers, to each of the secure computation devices, a request to send a result fragment based on a secure computation result corresponding to any one of the original data fragments, and transfers the result fragments. The relay device controls timing with which original data fragments are transferred and timing with which a request to send is transferred.

Effects of the Invention

In the present invention, since a relay device controls timing with which original data fragments and a request to send are transferred, irrespective of timing with which processing is started, it is possible to obtain a correct analysis result.

BRIEF DESCRIPTION OF THE DRAWINGS

FIG. 8A is a flow diagram for explaining analysis processing in the analyzing device of the embodiment, FIG. 8B is a flow diagram for explaining analysis processing in the relay device of the embodiment, and FIG. 8C is a flow diagram for explaining analysis processing in the secure computation device of the embodiment.

FIG. 12 is a sequence diagram for explaining a specific example (N=2) of the registration processing (under abnormal conditions) of the third embodiment.

DETAILED DESCRIPTION OF THE EMBODIMENTS

Figure 1:
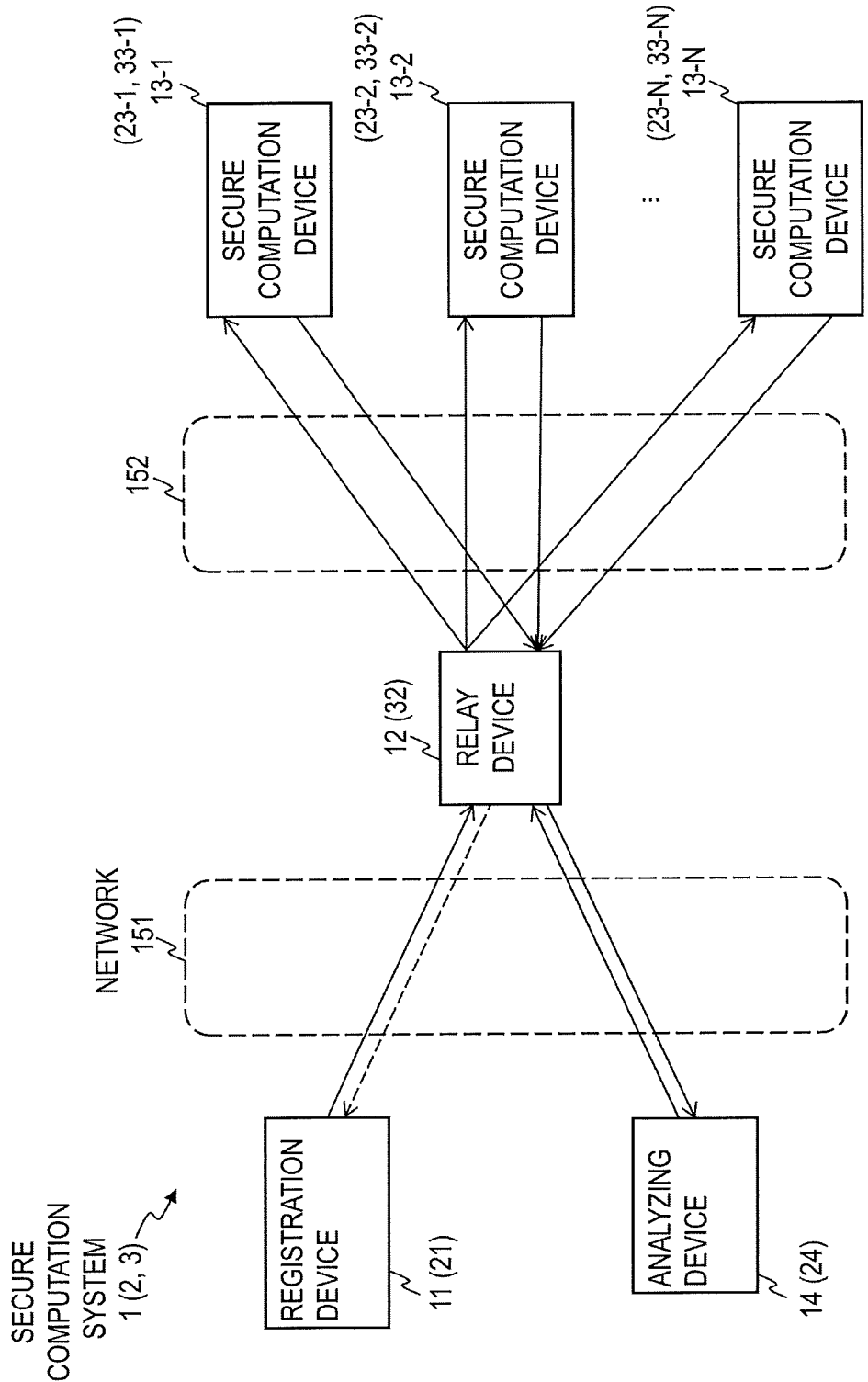
FIG. 1 is a block diagram illustrating the functional configuration of a secure computation system of an embodiment.

Prior to explanations of embodiments, fundamental technical concepts which are used in the embodiments of the present invention will be explained.

[Secret Sharing Technology]

Secret sharing is a technology that converts data into a plurality of distributed values (secret sharing values) and makes it possible to reconstruct the original data through the use of secret sharing values whose number is greater than or equal to a given number and makes it impossible to reconstruct the original data from secret sharing values whose number is smaller than the given number. (k, n)-secret sharing, which is a type of secret sharing, is secret sharing by which n secret sharing values obtained by dividing the input plain text into n parts are distributed over n calculation entities and the plain text can be reconstructed if arbitrary k secret sharing values become complete, but any information on the plain text cannot be obtained from secret sharing values whose number is smaller than k. At this time, n and k are integers which are greater than or equal to 1 (where (k, n)-secret sharing functions as secret sharing when n and k are integers which are greater than or equal to 2) and n≥k holds. A typical example of (k, n)-secret sharing is Shamir secret sharing described in "A. Shamir, "How to share a secret", Communications of the ACM, Volume 22 Issue 11, pp. 612-613, 1979. (Reference Literature 1)". Secret sharing which is used in each embodiment may be any secret sharing as long as that secret sharing makes it possible to use secure computation which will be described later.

[Secure Computation Technology]

Secure computation is a technology by which data (original data) to be calculated is subjected to secret sharing and stored in a plurality of calculation entities and secret sharing values of function values of the original data are calculated in cooperation with other calculation entities without reconstruction of the original data. In secure computation, secret sharing is used as an element technology.

As secure computation which is used in each embodiment, secure computation which allows various calculations required for desired data processing to be performed on secret sharing values obtained by a particular secret sharing method may be used as appropriate. A secure computation technology by which basic calculations such as addition and multiplication are performed on secret sharing values is described in, for example, "Koji Chida, Koki Hamada, Dai Ikarashi, Katsumi Takahashi, "A Three-party Secure Function Evaluation with Lightweight Verifiability Revisited", Computer Security Symposium 2010, 2010 (Reference Literature 2)". A secure matching technology by which search is made from secret sharing values of a data string with information being concealed is described in, for example, "Koji Chida, Masayuki Terada, Takayasu Yamaguchi, Dai Ikarashi, Koki Hamada, Katsumi Takahashi, "A Secure Matching Protocol with Statistical Disclosure Control", IPSJ SIG Technical Report, 2011-CSEC-52(12), 2011 (Reference Literature 3)". A secret sorting technology by which secret sharing values of a data string are sorted with the secret sharing values being concealed is described in, for example, "Koki Hamada, Dai Ikarashi, Koji Chida, Katsumi Takahashi, "A linear time sorting algorithm on secure function evaluation", Computer Security Symposium 2011, 2011 (Reference Literature 4)".

Hereinafter, the embodiments will be described.

First Embodiment

In the present embodiment, a relay device is provided which transfers a plurality of original data fragments corresponding to a plurality of secret sharing values of original data to a plurality of secure computation devices, transfers, to each of the secure computation devices, a request (an analysis request) to send a result fragment based on a secure computation result corresponding to any one of the original data fragments, and transfers the result fragments. The relay device controls timing with which the original data fragments are transferred and timing with which the analysis request is transferred. As a result, irrespective of timing with which processing is started, a correct analysis result can be obtained.

For example, when transfer of the original data fragments is started, the relay device suspends transfer of the analysis request until the transfer of the original data fragments is completed; when transfer of the analysis request is started, the relay device suspends transfer of the original data fragments until the transfer of the result fragments is completed. As a result, irrespective of timing with which registration processing of the original data fragments is started and timing with which the analysis request is started, transfer of the analysis request is started after the completion of the transfer of all the original data fragments or transfer of the original data fragments is started after the completion of the transfer of all the result fragments for the analysis request. Consequently, no mismatch occurs in the order of arrival of the original data fragments or analysis request between the secure computation devices, and a correct analysis result can be obtained.

Moreover, for example, the relay device further transfers a plurality of second original data fragments corresponding to a plurality of secret sharing values of second original data to the secure computation devices, transfers, to each of the secure computation devices, a request to send a second result fragment based on a secure computation result corresponding to any one of the second original data fragments, and transfers the second result fragments. When transfer of the above-described original data fragments is started, the relay device suspends transfer of the second original data fragments until the transfer of the above-described original data fragments is completed. As a result, irrespective of timing with which registration processing of the above-described original data fragments is started and registration processing of the second original data fragments, transfer of the second original data fragments is started after the completion of the transfer of all the original data fragments. Consequently, no mismatch occurs in the order of arrival of the original data fragments and the second original data fragments between the secure computation devices, and a correct analysis result can be obtained.

Hereinafter, the present embodiment will be described in detail.

<Overall Configuration>

As illustrated in FIG. 1, a secure computation system 1 of the present embodiment includes a registration device 11, a relay device 12, a plurality of secure computation devices 13-1 to 13-N, and an analyzing device 14. Here, N is an integer which is greater than or equal to 2. The relay device 12 of the present embodiment is configured such that the relay device 12 can perform communication with the registration device 11 and the analyzing device 14 via a network 151 and is configured such that the relay device 12 can perform communication with the secure computation devices 13-1 to 13-N via a network 152. Depending on the method of secure computation, communication via the network 152 may be possible between the plurality of secure computation devices 13-1 to 13-N. Moreover, the networks 151 and 152 may be one and the same network or may be different networks. The registration device 11, the relay device 12, the secure computation devices 13-1 to 13-N, and the analyzing device 14 are, for example, devices which are configured as a result of a general-purpose or dedicated computer, which is provided with a processor (a hardware processor) such as a central processing unit (CPU), memory such as random-access memory (RAM) or read-only memory (ROM), a communication device, and so forth, executing a predetermined program. This computer may be provided with one processor or one type of memory or may be provided with a plurality of processors or a plurality of types of memory. This program may be installed in the computer or may be recorded on the ROM or the like in advance. Furthermore, instead of using an electronic circuit (circuitry) that implements, like a CPU, functional configurations as a result of a program being read, part or all of the processing units may be configured by using an electronic circuit that implements processing functions without using a program. In addition, an electronic circuit forming one device may include a plurality of CPUs.

<Registration Device 11>

Figure 2A:
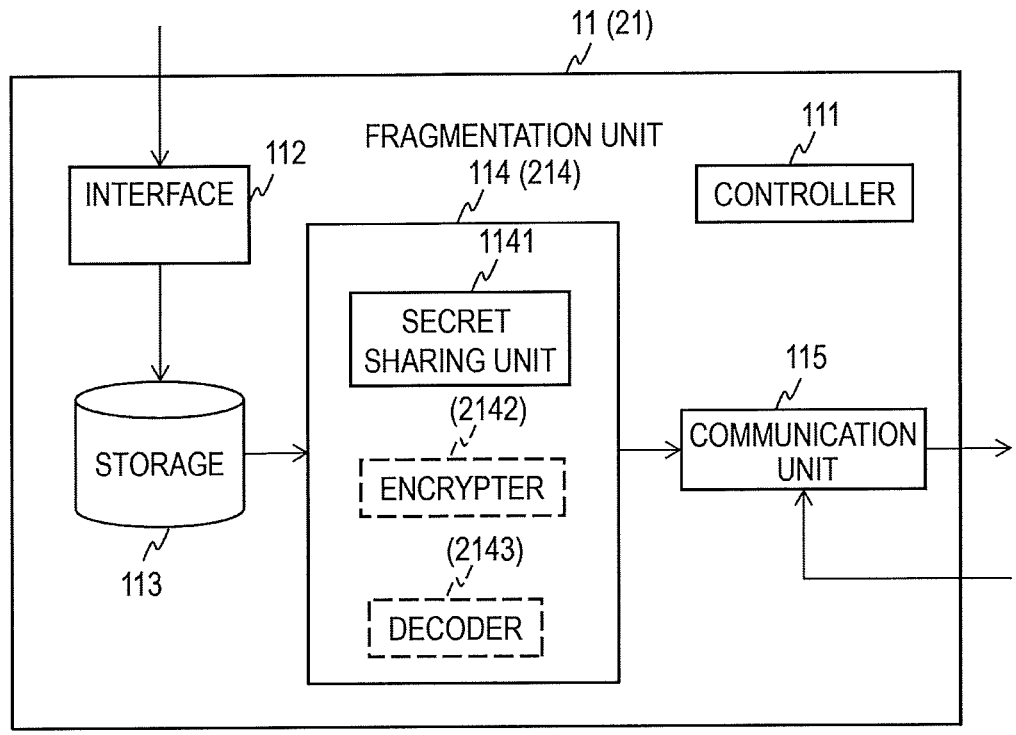
FIG. 2A is a block diagram illustrating the functional configuration of a registration device of the embodiment and FIG. 2B is a block diagram illustrating the functional configuration of an analyzing device of the embodiment.

As illustrated in FIG. 2A, the registration device 11 of the present embodiment includes a controller 111, an interface 112, a storage 113, a fragmentation unit 114, and a communication unit 115, and the fragmentation unit 114 includes a secret sharing unit 1141. The registration device 11 executes each processing operation based on the control of the controller 111.

<Relay Device 12>

Figure 3:
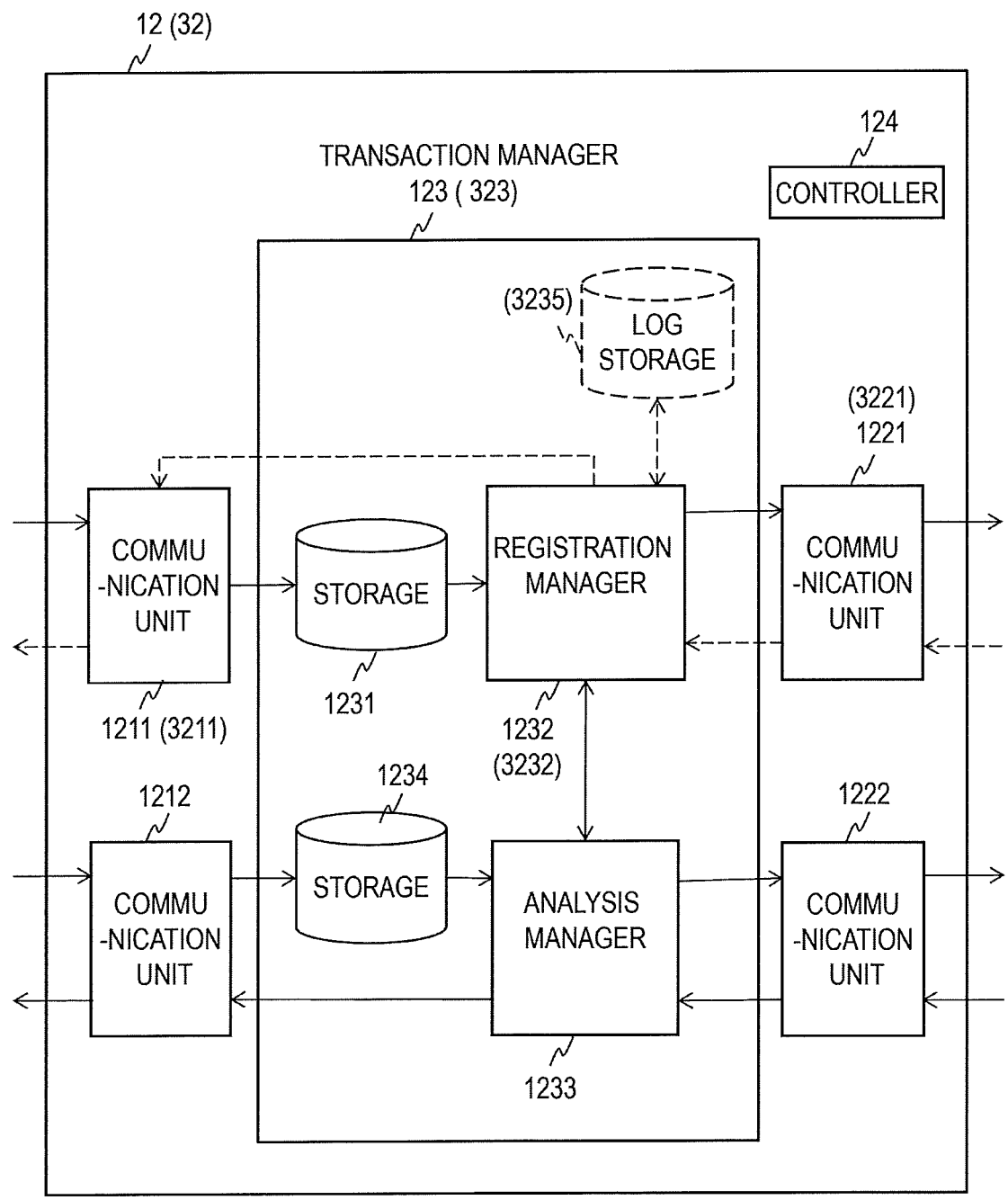
FIG. 3 is a block diagram illustrating the functional configuration of a relay device of the embodiment.

As illustrated in FIG. 3, the relay device 12 of the present embodiment includes communication units 1211, 1212, 1221, and 1222, a transaction manager 123, and a controller 124, and the transaction manager 123 includes storages 1231 and 1234, a registration manager 1232, and an analysis manager 1233. The relay device 12 executes each processing operation based on the control of the controller 124.

<Secure Computation Device 13-$i$>

Figure 4:
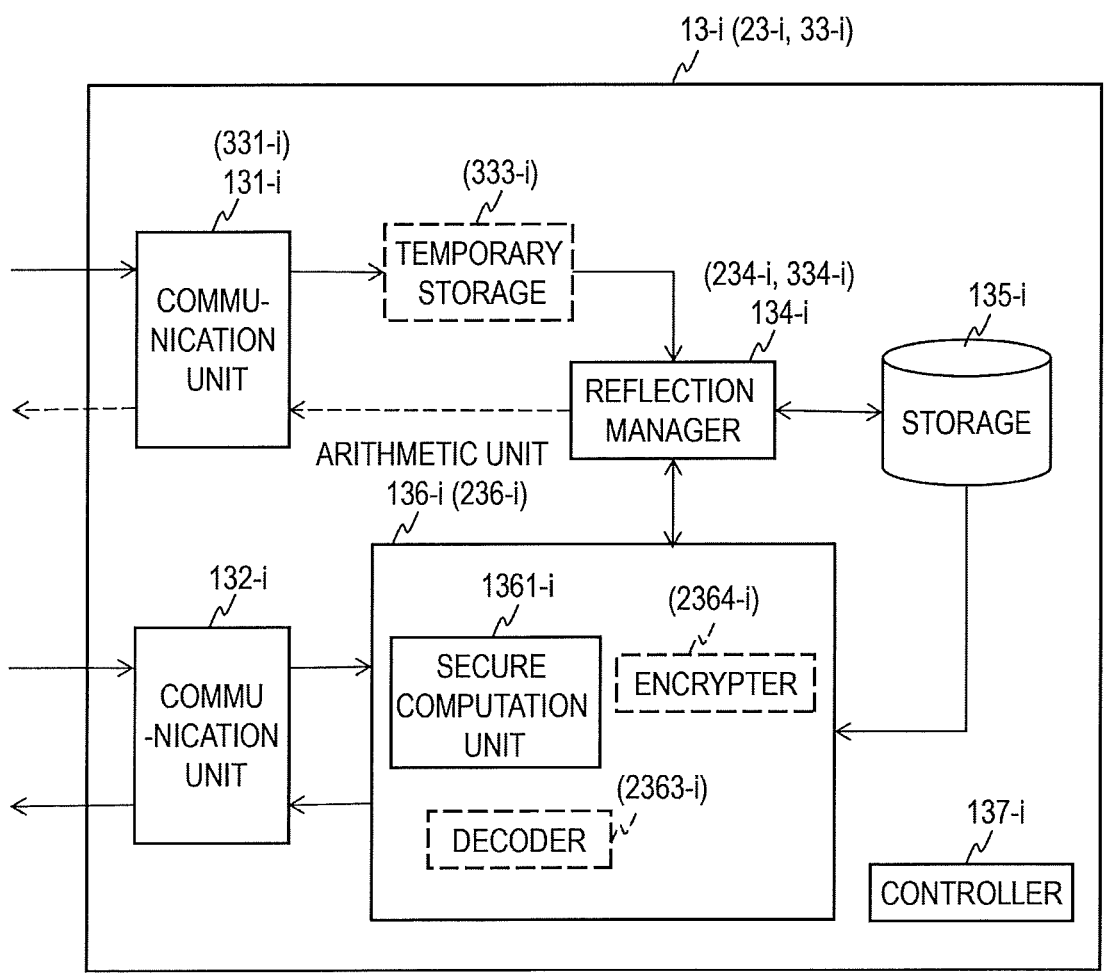
FIG. 4 is a block diagram illustrating a secure computation device of the embodiment.

As illustrated in FIG. 4, each secure computation device 13-$i$ (where i=1, . . . , N) of the present embodiment includes communication units 131-$i$ and 132-$i$, a reflection manager 134-$i$, a storage 135-$i$, an arithmetic unit 136-$i$, and a controller 137-$i$, and the arithmetic unit 136-$i$ includes a secure computation unit 1361-$i$. Each secure computation device 13-$i$ executes each processing operation based on the control of the controller 137-$i$.

<Analyzing Device 14>

Figure 2B:
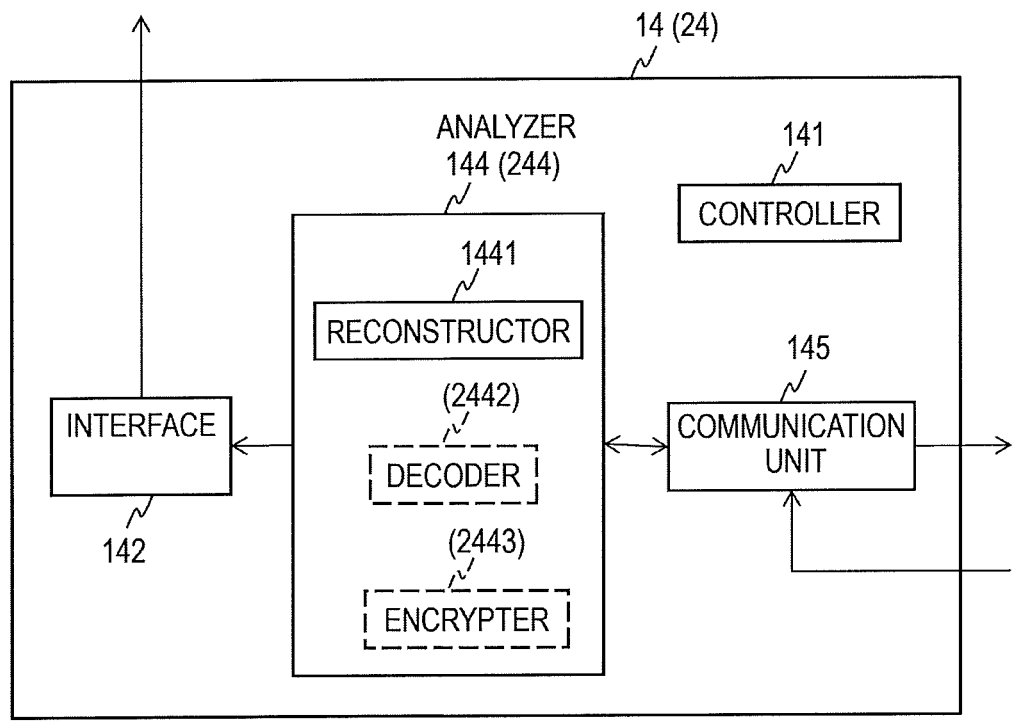

As illustrated in FIG. 2B, the analyzing device 14 of the present embodiment includes a controller 141, an interface 142, an analyzer 144, and a communication unit 145, and the analyzer 144 includes a reconstructor 1441. The analyzing device 14 executes each processing operation based on the control of the controller 141.

<Registration Processing>

In registration processing, the registration device 11 performs secret sharing on original data to be calculated and stores the resultant data in the secure computation devices 13-1 to 13-N. Registration processing may be executed arbitrary times, and no restrictions are put on timing with which each registration processing operation is started. Hereinafter, with reference to flow diagrams of FIGS. 5 to 7, the registration processing of the present embodiment will be described.

First, original data is input to the interface 112 of the registration device 11 (FIG. 2A) and stored in the storage 113. The original data is an operand of part or all of calculations on which secure computation is to be performed and is, for example, text data (comma-separated values (CSV) files and the like) including numerical values or characters, image data, sound data, or the like (FIG. 5: Step S1101). Next, the secret sharing unit 1141 of the fragmentation unit 114 obtains N secret sharing values by performing secret sharing on the original data read from the storage 113 and outputs the N secret sharing values as original data fragments $\alpha_1, \ldots, \alpha_N$ (a plurality of original data fragments) (Step S1102). The original data fragments $\alpha_1, \ldots, \alpha_N$ are transmitted to the communication unit 115, and the communication unit 115 sends the original data fragments $\alpha_1, \ldots, \alpha_N$ to the relay device 12 via the network 151 (Step S1104).

Figure 6:
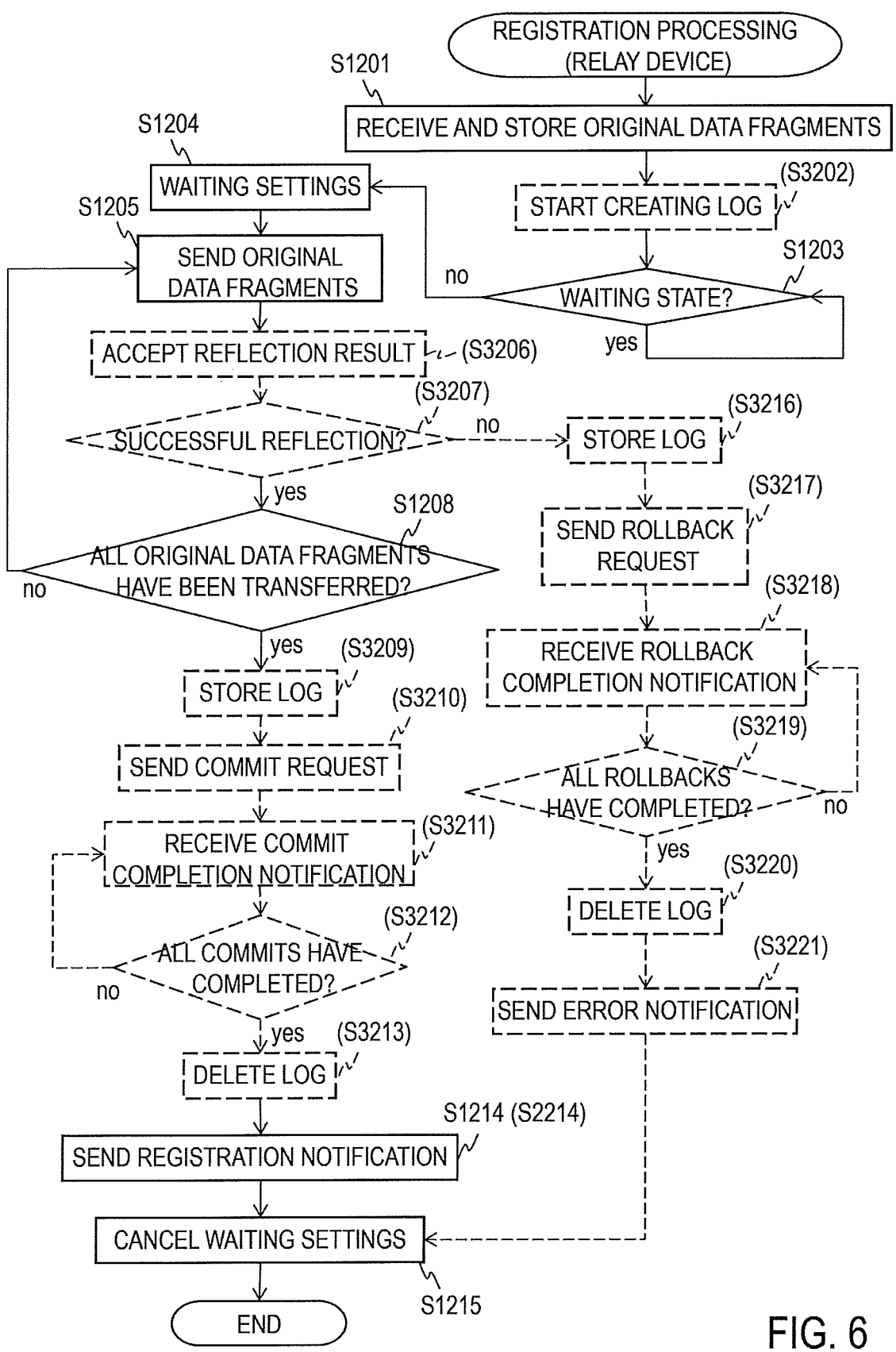
FIG. 6 is a flow diagram for explaining registration processing in the relay device of the embodiment.

The original data fragments $\alpha_1, \ldots, \alpha_N$ are received by the communication unit 1211 of the relay device 12 (FIG. 3) and stored in the storage 1231 of the transaction manager 123 (FIG. 6: Step S1201). The registration manager 1232 exchanges information with the analysis manager 1233 and judges in which processing the state enters a "waiting state". The "waiting state" means a state in which an instruction to suspend processing is issued. This "waiting state" is generated in the registration processing or analysis processing which will be described later. In an initial state, no processing is in the "waiting state" (Step S1203). Here, when it is judged that the state is the "waiting state", the processing is suspended until the state moves out of the "waiting state" and the judgment in Step S1203 is repeated. By so doing, timing with which the original data fragments $\alpha_1, \ldots, \alpha_N$ are transferred is controlled. On the other hand, when it is judged that the state is not the "waiting state", the registration manager 1232 makes waiting settings. As a result, a new "waiting state" is generated and other subsequent processing is brought into a suspended state (Step S1204). Next, the registration manager 1232 reads the original data fragments $\alpha_1, \ldots, \alpha_N$ from the storage 1231 and transmits the read original data fragments $\alpha_1, \ldots, \alpha_N$ to the communication unit 1221. The communication unit 1221 (a first communication unit) transfers (sends) the original data fragments $\alpha_1, \ldots, \alpha_N$ (a plurality of original data fragments corresponding to a plurality of secret sharing values of original data) to the plurality of secure computation devices 13-1, . . . , 13-N via the network 152. As a result, the plurality of original data fragments $\alpha_1, \ldots, \alpha_N$ are distributed over the plurality of secure computation devices 13-1, . . . , 13-N. The communication unit 1221 of the present embodiment transfers each original data fragment $\alpha_i$ to each secure computation device 13-$i$ (Step S1205). The original data fragment $\alpha_i$ transferred from the relay device 12 is received by the communication unit 131-$i$ of the secure computation device 13-$i$ (FIG. 4) (FIG. 7: Step S1301-$i$) and transmitted to the reflection manager 134-$i$. The reflection manager 134-$i$ saves the original data fragment $\alpha_i$ in the storage 135-$i$ (Step S1307-$i$).

The communication unit 1221 of the relay device 12 (FIG. 3) judges whether or not all the original data fragments $\alpha_1, \ldots, \alpha_N$ have been transferred to the secure computation devices 13-1, . . . , 13-N (FIG. 6: Step S1208). Here, if all the original data fragments $\alpha_1, \ldots, \alpha_N$ have not been transferred yet, the procedure goes back to Step S1205. On the other hand, if all the original data fragments $\alpha_1, \ldots, \alpha_N$ have been transferred, the registration manager 1232 transmits a registration notification to the communication unit 1211 and the communication unit 1211 sends the registration notification to the registration device 11 via the network 151 (Step S1214). The registration notification is received by the communication unit 115 of the registration device 11 (FIG. 2A) (FIG. 5: Step S1105). Then, the registration manager 1232 of the relay device 12 (FIG. 3) cancels the waiting settings made in Step S1204. Consequently, the "waiting state" generated in Step S1204 is lifted (FIG. 6: Step S1215).

<Analysis Processing>

In analysis processing, the analyzing device 14 makes a request to send a result fragment and reconstructs an analysis result from a plurality of result fragments transmitted thereto. The result fragments are based on secure computation results for the original data fragments $\alpha_1, \ldots, \alpha_N$ stored in the secure computation devices 13-1 to 13-N. The analysis processing may be executed arbitrary times, and no restrictions are put on timing with which each analysis processing operation is started. Hereinafter, with reference to flow diagrams of FIGS. 8A to 8C, the analysis processing of the present embodiment will be described.

First, the communication unit 145 of the analyzing device 14 (FIG. 2B) sends an analysis request (a request to send a result fragment (information)) to the relay device 12 via the network 151 (FIG. 8A: Step S1111). The analysis request is received by the communication unit 1212 of the relay device 12 (FIG. 3) and stored in the storage 1234 (FIG. 8B: Step S1231). The analysis manager 1233 exchanges information with the registration manager 1232 and judges whether the state is in the "waiting state" of the above-described registration processing (whether the state is in the state in Steps S1204 to S1215) (Step S1232). Here, if it is judged that the state is in the "waiting state" of the registration processing, the processing is suspended until the state moves out of the "waiting state" and the judgment in Step S1232 is repeated. By so doing, timing with which an analysis request (a request to send a result fragment) is transferred is controlled. On the other hand, if it is judged that the state is not in the "waiting state" of the registration processing, the analysis manager 1233 makes waiting settings. Incidentally, as for the "waiting state" in the analysis processing (the state in Steps S1233 to S1237), it is judged that "the state is not in the "waiting state" of the registration processing" also in a case where the state is not the "waiting state" of the registration processing. By the above waiting settings, a new "waiting state" is generated and the subsequent registration processing is brought into a suspended state (Step S1233). Next, the analysis manager 1233 reads the analysis request from the storage 1234 and transmits the read analysis request to the communication unit 1222. The communication unit 1222 (a second communication unit) transfers (sends) the analysis request (a request to send a result fragment based on a secure computation result corresponding to any one of the original data fragments) to the N secure computation devices 13-1, . . . , 13-N via the network 152 (Step S1234).

The secure computation device 13-$i$ (FIG. 4) to which the analysis request has been transferred receives the analysis request in the communication unit 132-$i$ and transmits the analysis request to the arithmetic unit 136-$i$ (FIG. 8C: Step S1321-$i$). The secure computation unit 1361-$i$ of the arithmetic unit 136-$i$ reads the original data fragment $\alpha_i$ from the storage 135-$i$, performs secure computation on the original data fragment $\alpha_i$, and outputs the secure computation result thus obtained as a result fragment $\beta_i$. This secure computation may be performed by using only the data fragment $\alpha_i$, may be performed by using a value other than the original data fragment $\alpha_i$, or may be performed in cooperation with another secure computation device 13-$m$ (where m≠i and m ∈ {1, . . . , N}) (Step S1323-$i$). The result fragment $\beta_i$ is transmitted to the communication unit 132-$i$, and the communication unit 132-$i$ sends the result fragment $\beta_i$ to the relay device 12 via the network 152 (Step S1325-$i$).

The result fragment $\beta_{\varphi(j)}$ sent from each secure computation device 13-$\varphi(j)$ (where j ∈ 1, . . . , K) is received by the communication unit 1222 of the relay device 12 (FIG. 3) and transmitted to the analysis manager 1233. Here, {$\varphi(1), . . . , \varphi(K)$} ⊂ {1, . . . , N} holds and K is an integer (K≤N) which is greater than or equal to 2 but smaller than or equal to N. The number K depends on the method of secret sharing which is used and the result can be reconstructed if K secret sharing values (result fragments) become complete. The analysis manager 1233 transmits each result fragment $\beta_{\varphi(j)}$ to the communication unit 1212, and the communication unit 1212 (a third communication unit) transfers (sends) each result fragment $\beta_{\varphi(j)}$ (a result fragment based on a secure computation result corresponding to any one of the original data fragments) to the analyzing device 14 via the network 151 (FIG. 8B: Step S1235). The analysis manager 1233 judges whether all the result fragments $\beta_{\varphi(j)}$ (where j ∈ 1, . . . , K) have been transferred to the analyzing device 14 (Step S1236). Here, if any result fragment $\beta_{\varphi(j)}$ has not been transferred yet, the procedure goes back to Step S1235. On the other hand, if all the result fragments $\beta_{\varphi(1)}, . . . , \beta_{\varphi(K)}$ have been transferred, the analysis manager 1233 cancels the waiting settings made in Step S1233. Consequently, the "waiting state" generated in Step S1233 is lifted (Step S1237).

The communication unit 145 of the analyzing device 14 (FIG. 2B) receives the result fragment $\beta_{\varphi(j)}$ transferred from the relay device 12 and transmits the result fragment $\beta_{\varphi(j)}$ to the analyzer 144 (FIG. 8A: Step S1112). The reconstructor 1441 of the analyzer 144 reconstructs an analysis result by reconstruction processing of secret sharing by using the transmitted result fragments $\beta_{\varphi(1)}, . . . , \beta_{\varphi(K)}$ and outputs the analysis result. The output analysis result is output from the interface 142 (Step S1114).

<Feature of the Present Embodiment>

In the present embodiment, the relay device 12 is disposed in communication paths between the registration device 11 and the secure computation devices 13-1 to 13-N and between the analyzing device 14 and the secure computation devices 13-1 to 13-N, and transaction management is performed. As a result, irrespective of timing with which each processing operation is started, a correct analysis result can be obtained. That is, the relay device 12 transfers, to the secure computation devices 13-1 to 13-N, the original data fragments $\alpha_1, . . . , \alpha_N$ transmitted from the registration device 11 at the time of registration processing and transfers, to the secure computation devices 13-$\varphi(1), . . . , 13-\varphi(K)$, the analysis request transmitted from the analyzing device 14 at the time of analysis processing, and controls timing of these transfers. For instance, when transfer of the original data fragments is started, the relay device 12 suspends transfer of the analysis request until the transfer of the original data fragments is completed (FIG. 6: Steps S1204 and S1215, FIG. 8B: Step S1232); when transfer of the analysis request is started, the relay device 12 suspends transfer of the original data fragments until the transfer of the result fragment is completed (FIG. 8B: Steps S1233 and S1237, and FIG. 6: Step S1203). As a result, no mismatch occurs in the order of arrival of the original data fragments or analysis request between the secure computation devices 13-1 to 13-N, and a correct analysis result can be obtained. Moreover, even when a plurality of registration processing operations are executed, the relay device 12 controls timing of the transfers thereof. For example, when transfer of the above-described original data fragments $\alpha_1, . . . , \alpha_N$ is started, the relay device 12 suspends transfer of other second original data fragments $\alpha_1', . . . , \alpha_N'$ until the transfer of the above-described original data fragments $\alpha_1, . . . , \alpha_N$ is completed (FIG. 6: Steps S1203, S1204, and S1215). Consequently, no mismatch occurs in the order of arrival of the original data fragments $\alpha_1, . . . , \alpha_N$ and the second original data fragments $\alpha_1', . . . , \alpha_N'$ between the secure computation devices 13-1 to 13-N, and a correct analysis result can be obtained. Incidentally, even when a plurality of analysis processing operations are started, control of timing of these analysis processing operations is not performed (FIG. 8B: Step S1232). The reason is that a conflict between the plurality of analysis processing operations does not cause a mismatch in the data stored in the secure computation devices 13-1 to 13-N. This makes it possible to prevent a delay in processing from being caused by unnecessary waiting settings.

Second Embodiment

The relay device can obtain a plurality of original data fragments or result fragments, and, in the case of a vulnerable relay device, there is a possibility of leakage of the original data or analysis result. To address this problem, in the present embodiment, communication paths between the registration device and the secure computation devices are encrypted. That is, cipher text obtained by encrypting each of the secret sharing values in such a way that decoding is possible in each of the secure computation devices is treated as an "original data fragment" (Action 1). This makes it possible to prevent leakage of the original data. Moreover, communication paths between the analyzing device and the secure computation devices are encrypted. That is, cipher text obtained by encrypting each of the secure computation results in such a way that decoding is possible in the analyzing device is treated as a "result fragment" (Action 2). This makes it possible to prevent leakage of the analysis result. Incidentally, a secret sharing value of cipher text is not treated as an "original data fragment", but cipher text obtained by encrypting each of the secret sharing values in such a way that decoding is possible in each of the secure computation devices is treated as an "original data fragment". In the former case, the secure computation device cannot perform secure computation by using the "original data fragment" unless special thought is given to a cryptosystem and a secret sharing method. In the present embodiment, by treating, as an "original data fragment", cipher text obtained by encrypting each of the secret sharing values in such a way that decoding is possible in each of the secure computation devices, it is possible to perform secure computation in the secure computation devices while encrypting the communication paths between the registration device and the secure computation devices. Although it is desirable that both Actions 1 and 2 are performed, only one of Actions 1 and 2 may be performed. Hereinafter, an example in which both Actions 1 and 2 are performed will be described. Hereinafter, as for a portion which has already been explained in the above description, the reference numeral used in the above description will be used therefor and the explanation of the portion will be omitted.

<Overall Configuration>

As illustrated in FIG. 1, a secure computation system 2 of the present embodiment is obtained by replacing the registration device 11 and the analyzing device 14 of the secure computation system 1 of the first embodiment with a registration device 21 and an analyzing device 24, respectively, and includes the registration device 21, a relay device 12, a plurality of secure computation devices 23-1 to 23-N, and the analyzing device 24. The relay device 12 of the present embodiment is configured such that the relay device 12 can perform communication with the registration device 21 and the analyzing device 24 via a network 151 and is configured such that the relay device 12 can perform communication with the secure computation devices 23-1 to 23-N via a network 152. Depending on the method of secure computation, communication via the network 152 may be possible between the plurality of secure computation devices 23-1 to 23-N. The registration device 21, the secure computation devices 23-1 to 23-N, and the analyzing device 24 are, for example, devices which are configured as a result of the above-described computer executing a predetermined program.

<Registration Device 21>

As illustrated in FIG. 2A, the registration device 21 of the present embodiment includes a controller 111, an interface 112, a storage 113, a fragmentation unit 214, and a communication unit 115. The fragmentation unit 214 includes a secret sharing unit 1141, an encrypter 2142, and a decoder 2143. The registration device 21 executes each processing operation based on the control of the controller 111.

<Secure Computation Device 23-$i$>

As illustrated in FIG. 4, each secure computation device 23-$i$ (where i=1, N) of the present embodiment includes communication units 131-$i$ and 132-$i$, a reflection manager 234-$i$, a storage 135-$i$, an arithmetic unit 236-$i$, and a controller 137-$i$. The arithmetic unit 236-$i$ includes a secure computation unit 1361-$i$, a decoder 2363-$i$, and an encrypter 2364-$i$. Each secure computation device 23-$i$ executes each processing operation based on the control of the controller 137-$i$.

<Analyzing Device 24>

As illustrated in FIG. 2B, the analyzing device 24 of the present embodiment includes a controller 141, an interface 142, an analyzer 244, and a communication unit 145. The analyzer 244 includes a reconstructor 1441, a decoder 2442, and an encrypter 2443. The analyzing device 24 executes each processing operation based on the control of the controller 141.

<Registration Processing>

Figure 5:
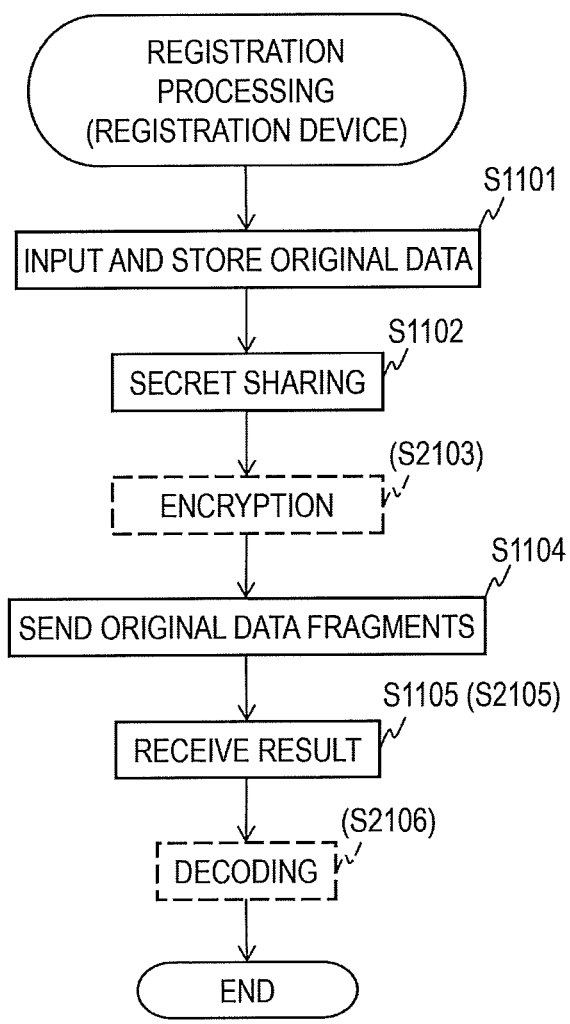
FIG. 5 is a flow diagram for explaining registration processing in the registration device of the embodiment.

With reference to the flow diagrams of FIGS. 5 to 7, registration processing of the present embodiment will be described. First, the registration device 21 (FIG. 2A) executes processing in Steps S1101 and S1102 (FIG. 5) described in the first embodiment. The N secret sharing values $a_1, \ldots, a_N$ obtained in S1102 are transmitted to the encrypter 2142. The encrypter 2142 encrypts each secret sharing value $a_i$ (where i=1, . . . , N) in such a way that decoding is possible in each secure computation device 23-$i$ and outputs cipher text Enc1($a_i$) of each secret sharing value $a_i$ as an original data fragment $\alpha_i$. A cryptosystem that is used in this encryption is not limited to a particular cryptosystem, and a publicly known symmetric key cryptosystem, public key cryptosystem, ID-based cryptosystem, or the like can be used. For instance, if a symmetric key cryptosystem is used, the encrypter 2142 and the secure computation device 23-$i$ share a symmetric key K1($i$), and the encrypter 2142 obtains cipher text $\alpha_i$=Enc1($a_i$) by encrypting the secret sharing value $a_i$ by using the symmetric key K1($i$) in accordance with a predetermined symmetric key cryptosystem. The cipher text $\alpha_i$ is cipher text of a request containing the secret sharing value $a_i$, for example (Step S2103). The original data fragments $\alpha_1, \ldots, \alpha_N$ (a plurality of original data fragments) are transmitted to the communication unit 115, and the communication unit 115 sends the original data fragments $\alpha_1, \ldots, \alpha_N$ to the relay device 12 via the network 151 (Step S1104).

Then, as described in the first embodiment, the relay device 12 executes processing in Steps S1201 to S1215 (FIG. 6). The original data fragment $\alpha_i$ transferred from the relay device 12 is received by the communication unit 131-$i$ of the secure computation device 23-$i$ (FIG. 4) and transmitted to the decoder 2363-$i$ of the arithmetic unit 236-$i$. The decoder 2363-$i$ obtains the secret sharing value $a_i$ by decoding the original data fragment $\alpha_i$=Enc1($a_i$) in accordance with the cryptosystem in Step S2103 (FIG. 5). For example, if the cryptosystem in Step S2103 is a symmetric key cryptosystem, the decoder 2363-$i$ obtains the secret sharing value $a_i$ by decoding the original data fragment $\alpha_i$=Enc1($a_i$) by using the symmetric key K1($i$) (FIG. 7: Step S2306-$i$). The secret sharing value $a_i$ is transmitted to the reflection manager 234-$i$, and the reflection manager 234-$i$ saves the secret sharing value $a_i$ in the storage 135-$i$ (Step S2307-$i$). The reflection manager 234-$i$ generates a registration notification (a response) and transmits the registration notification (the response) to the encrypter 2364-$i$ of the arithmetic unit 236-$i$. The encrypter 2364-$i$ encrypts the registration notification in such a way that decoding is possible in the registration device 21 and outputs the encrypted registration notification. A system that is used in this encryption is not limited to a particular system, and a publicly known symmetric key cryptosystem, public key cryptosystem, ID-based cryptosystem, or the like can be used. For instance, if a symmetric key crypto system is used, the encrypter 2364-$i$ and the analyzing device 24 share a symmetric key K2($i$), and the encrypter 2364-$i$ obtains an encrypted registration notification by encrypting a registration notification by using the symmetric key K2($i$) in accordance with a predetermined symmetric key cryptosystem. The encrypted registration notification is sent to the relay device 12 from the communication unit 132-$i$ (Step S2308-$i$). The encrypted registration notification is received by the communication unit 1222 of the relay device 12 and sent (transferred) to the registration device 21 from the communication unit 1211 (FIG. 6: Step S2214). The registration notification is received by the communication unit 115 of the registration device 21 (FIG. 2A) (FIG. 5: Step S2105) and transmitted to the decoder 2143 of the fragmentation unit 214. The decoder 2143 obtains the registration notification by decoding the encrypted registration notification (Step S2106).

<Analysis Processing>

With reference to the flow diagrams of FIGS. 8A to 8C, analysis processing of the present embodiment will be described.

First, the encrypter 2443 of the analyzer 244 of the analyzing device 24 (FIG. 2B) generates an encrypted analysis request by encrypting an analysis request in such a way that decoding is possible in each secure computation device 23-$i$ (Step S2110). The encrypted analysis request is sent to the relay device 12 from the communication unit 145 (Step S2111). The relay device 12 executes processing in Steps S1231 to S1234 (FIG. 8B). However, in the present embodiment, in place of the "analysis request", the "encrypted analysis request" is used. The secure computation device 23-$i$ (FIG. 4) receives the encrypted analysis request in the communication unit 132-$i$ and transmits the encrypted analysis request to the arithmetic unit 236-$i$ (FIG. 8C: Step S2321-$i$). The decoder 2363-$i$ of the arithmetic unit 236-$i$ reconstructs the analysis request by decoding the encrypted analysis request (Step S2322-$i$), reads the secret sharing value $a_i$ from the storage 135-$i$ in accordance therewith, and transmits the secret sharing value $a_i$ to the secure computation unit 1361-$i$. The secure computation unit 1361-$i$ performs secure computation on the secret sharing value $a_i$ in place of the data fragment $\alpha_i$ in the manner described in the first embodiment and outputs a secure computation result $b_i$ thereof (Step S1323-$i$). The secure computation result $b_i$ is transmitted to the encrypter 2364-$i$. The encrypter 2364-$i$ encrypts the secure computation result $b_i$ in such a way that decoding is possible in the analyzing device 24 and outputs cipher text Enc2($b_i$) of the secure computation result $b_i$ as a result fragment $\beta_i$ (a result fragment based on a secure computation result of any one of the original data fragments). A system that is used in this encryption is not limited to a particular system, and a publicly known symmetric key cryptosystem, public key cryptosystem, ID-based cryptosystem, or the like can be used. For instance, if a symmetric key cryptosystem is used, the encrypter 2364-$i$ and the analyzing device 24 share a symmetric key K2($i$), and the encrypter 2364-$i$ obtains cipher text $\beta_i$=Enc2($b_i$) by encrypting the secure computation result $b_i$ by using the symmetric key K2($i$) in accordance with a predetermined symmetric key cryptosystem (Step S2324-$i$). The result fragment $\beta_i$=Enc2($b_i$) is transmitted to the communication unit 132-$i$, and the communication unit 132-$i$ sends the result fragment $\beta_i$ to the relay device 12 via the network 152 (Step S1325-$i$).

The result fragment $\beta_{\varphi(j)}$=Enc2($b_{\varphi(j)}$) sent from each secure computation device 23-$\varphi$(j) (where j ∈ 1, . . . , K) is received by the communication unit 1222 of the relay device 12 (FIG. 3) and transmitted to the analysis manager 1233. Then, as described in the first embodiment, the relay device 12 executes processing in Steps S1235 to S1237 (FIG. 8B).

The communication unit 145 of the analyzing device 24 (FIG. 2B) receives the result fragment $\beta_{\varphi(j)}$=Enc2($b_{\varphi(j)}$) transferred from the relay device 12 and transmits the result fragment $\beta_{\varphi(j)}$=Enc2($b_{\varphi(j)}$) to the analyzer 244 (FIG. 8A: Step S1112). The decoder 2442 of the analyzer 244 obtains a secure computation result $b_{\varphi(j)}$ by decoding the result fragment $\beta_{\varphi(j)}$=Enc2($\beta_{\varphi(j)}$) in accordance with the cryptosystem in Step S2324-$i$ (FIG. 8C). For example, if the cryptosystem in Step S2324-$i$ is a symmetric key cryptosystem, the decoder 2442 obtains the secure computation result $b_{\varphi(j)}$ by decoding the result fragment $\beta_{\varphi(j)}$=Enc2($b_{\varphi(j)}$) by using a symmetric key K2($\varphi$(j)) (Step S2113). The secure computation result $b_{\varphi(j)}$ is transmitted to the reconstructor 1441, and processing in Step S1114 described in the first embodiment is executed.

<Feature of the Present Embodiment>

Also in the present embodiment, the relay device 12 is disposed in the communication paths between the registration device 21 and the secure computation devices 23-1 to 23-N and between the analyzing device 24 and the secure computation devices 23-1 to 23-N, and transaction management is performed. As a result, irrespective of timing with which each processing operation is started, a correct analysis result can be obtained. Furthermore, in the present embodiment, each original data fragment is the cipher text obtained by encrypting each secret sharing value and/or each result fragment is the cipher text obtained by encrypting each of the secure computation results. As a result, even when the relay device 12 is vulnerable, it is possible to prevent the original data or analysis result from leaking to a third party. Incidentally, in the registration processing of the present embodiment, the original data fragment which is the cipher text is decoded and then stored in each secure computation device 23-$i$.

However, in the registration processing, each secure computation device 23-$i$ that has received the original data fragment which is the cipher text may store the original data fragment as it is. In this case, at the time of analysis processing, the secure computation device simply has to generate a secret sharing value by decoding the original data fragment and perform secure computation.

Third Embodiment

After the original data fragments are transferred to the secure computation devices, if some original data fragments are not correctly reflected in the secure computation devices due to, for example, a malfunction of the secure computation devices, there is a possibility that a mismatch occurs between the original data fragments of the secure computation devices and an incorrect analysis result is obtained. For example, assume that, although an original data fragment $\alpha_x$(5) corresponding to a secret sharing value of the latest value "5" is stored in a certain secure computation device x, another secure computation device y fails to store an original data fragment $\alpha_y$(5) corresponding to a secret sharing value of the latest value "5" and an original data fragment $\alpha_y$(3) corresponding to a secret sharing value of the past value "3" is left therein. If such a mismatch between the original data fragments occurs, a mismatch also occurs between the result fragments corresponding thereto, resulting in an incorrect analysis result.

Thus, in a relay device of the present embodiment, in registration processing, transaction control using two-phase commit is performed. In this registration processing, first, the relay device transfers original data fragments to the secure computation devices. If all the original data fragments on which this registration processing is to be executed are correctly reflected in the secure computation devices, registration of the original data fragments in the secure computation devices is completed. On the other hand, if any one of the transferred original data fragments is not correctly reflected in the secure computation device, the relay device provides all the secure computation devices that have stored the original data fragments in this registration processing with an instruction to cancel the original data fragments. As a result, without manually executing processing such as stopping a system, deleting failure data, and making a request to re-register the original data fragments, it is possible to eliminate a mismatch between the original data fragments of the secure computation devices and prevent an incorrect analysis result from being obtained. In the present embodiment, an example in which the transaction control using two-phase commit is applied to the first embodiment will be described.

<Overall Configuration>

As illustrated in FIG. 1, a secure computation system 3 of the present embodiment is obtained by replacing the relay device 12 and the secure computation devices 13-1 to 13-N of the first embodiment with a relay device 32 and secure computation devices 33-1 to 33-N, respectively, and includes a registration device 11, the relay device 32, the plurality of secure computation devices 33-1 to 33-N, and an analyzing device 14. The relay device 32 of the present embodiment is configured such that the relay device 32 can perform communication with the registration device 11 and the analyzing device 14 via a network 151 and is configured such that the relay device 32 can perform communication with the secure computation devices 33-1 to 33-N via a network 152. The relay device 32 and the secure computation devices 33-1 to 33-N are, for example, devices which are configured as a result of the above-described computer executing a predetermined program.

<Relay Device 32>

As illustrated in FIG. 3, the relay device 32 of the present embodiment includes communication units 3211, 1212, 3221, and 1222, a transaction manager 323, and a controller 124, and the transaction manager 323 includes storages 1231 and 1234, a log storage 3235, a registration manager 3232, and an analysis manager 1233. The relay device 32 executes each processing operation based on the control of the controller 124. The storages 1231 and 1234 are, for example, storage areas formed on memory such as semiconductor memory.

<Secure Computation Device 33-$i$>

As illustrated in FIG. 4, each secure computation device 33-$i$ (where i=1, ..., N) of the present embodiment includes communication units 331-$i$ and 132-$i$, a reflection manager 334-$i$, a temporary storage 333-$i$, a storage 135-$i$, an arithmetic unit 136-$i$, and a controller 137-$i$, and the arithmetic unit 136-$i$ includes a secure computation unit 1361-$i$. Each secure computation device 33-$i$ executes each processing operation based on the control of the controller 137-$i$.

<Registration Processing>

Hereinafter, with reference to FIGS. 5 to 7 and FIGS. 9 to 12, registration processing of the present embodiment will be described.

First, the registration device 11 executes processing in Steps S1101 to S1104 (FIGS. 5, 9, and 11) described in the first embodiment and sends the original data fragments $\alpha_1, \ldots, \alpha_N$ to the relay device 32.

Figure 9:
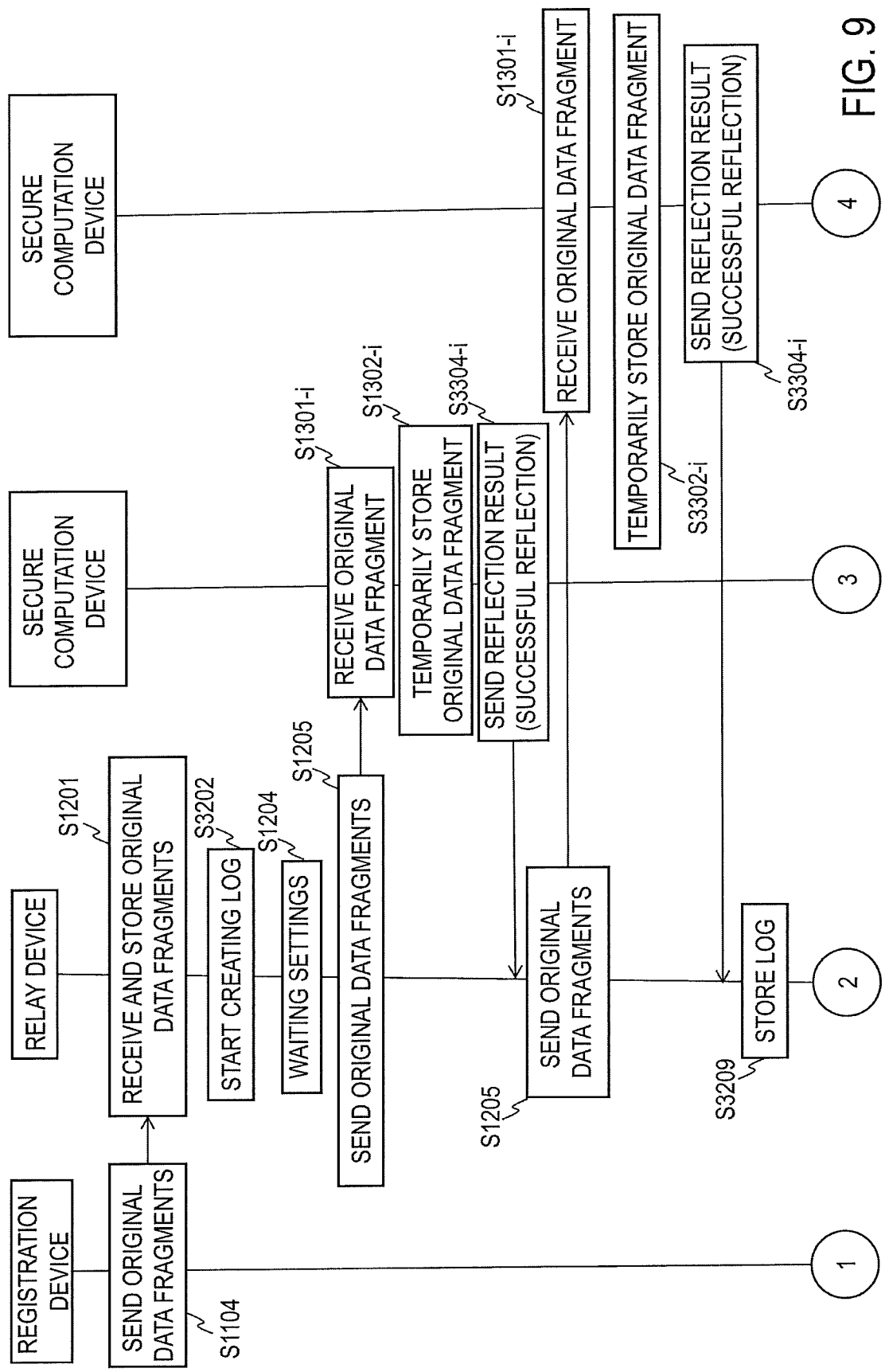
FIG. 9 is a sequence diagram for explaining a specific example of registration processing (under normal conditions) of a third embodiment.
Figure 11:
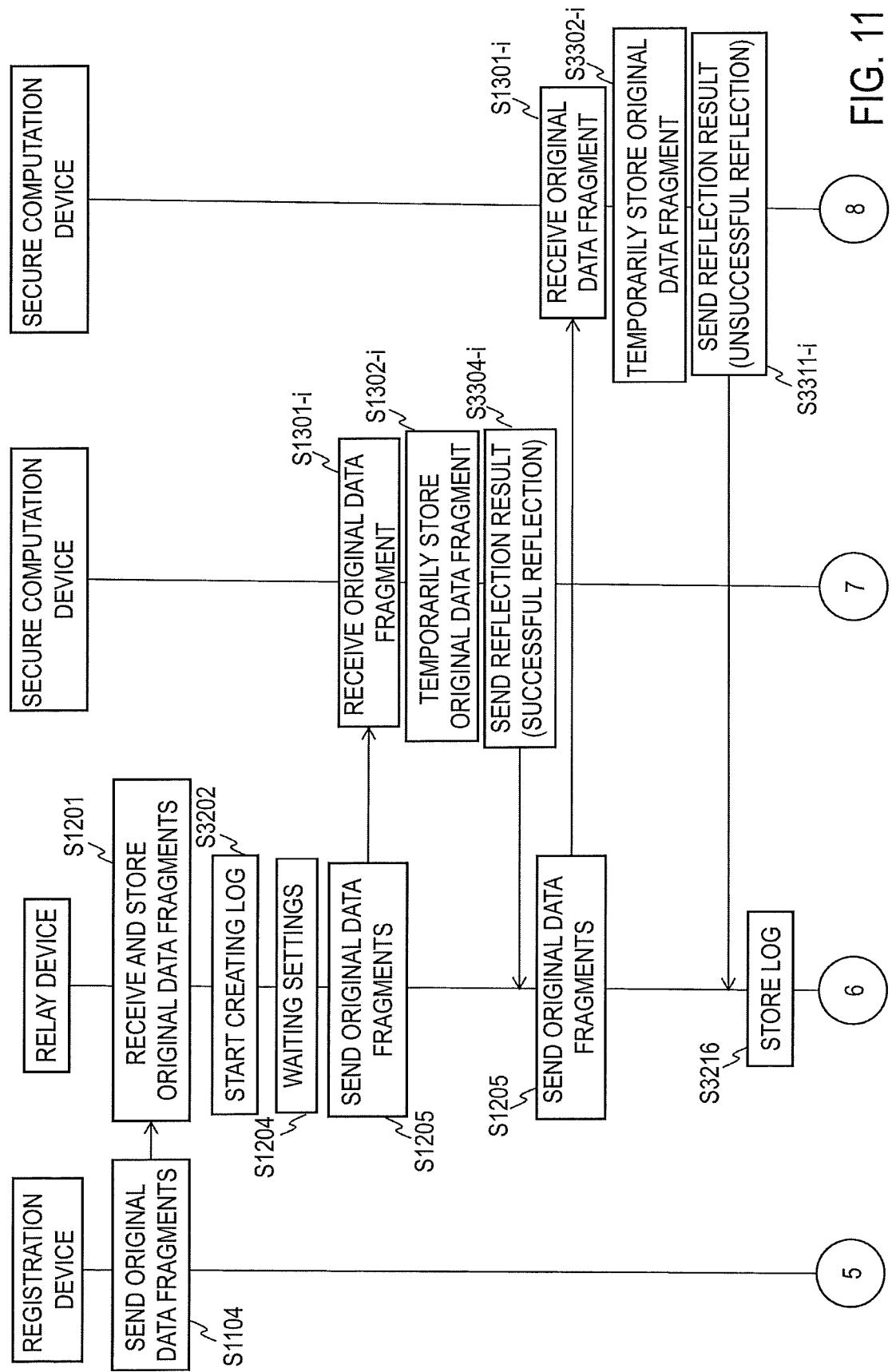
FIG. 11 is a sequence diagram for explaining a specific example (N=2) of the registration processing (under abnormal conditions) of the third embodiment.

The original data fragments $\alpha_1, \ldots, \alpha_N$ are received by the communication unit 3211 of the relay device 32 (FIG. 3) and stored in the storage 1231 of the transaction manager 323 (FIGS. 6, 9, and 11: Step S1201). As described above, when the original data fragments $\alpha_1, \ldots, \alpha_N$ are accepted, the registration manager 3232 starts creating a log indicating the details of the processing. After that, the created log is stored in temporary memory (not depicted in the drawing) of the registration manager 3232 (Step S3202). Next, after the processing in Steps S1203 and S1204 described in the first embodiment is executed, the registration manager 3232 reads the original data fragments $\alpha_1, \ldots, \alpha_N$ from the storage 1231 and transmits the original data fragments $\alpha_1, \ldots, \alpha_N$ to the communication unit 3221. The communication unit 3221 transfers (sends) the original data fragments $\alpha_1, \ldots, \alpha_N$ to the plurality of secure computation devices 33-1, ..., 33-N via the network 152. The communication unit 3221 of the present embodiment transfers each original data fragment $\alpha_i$ to each secure computation device 33-$i$ (Step S1205).

Figure 7:
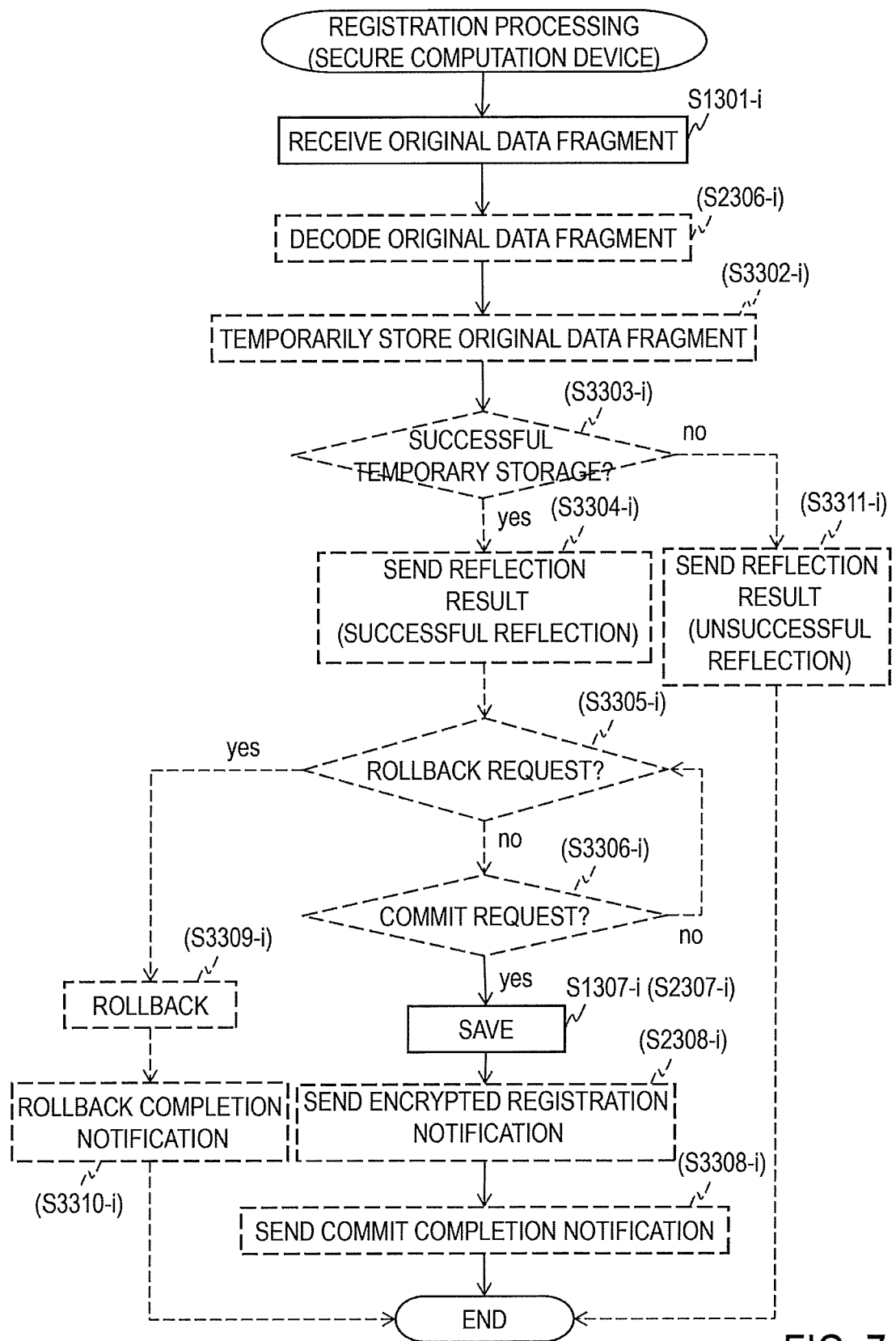
FIG. 7 is a flow diagram for explaining registration processing in the secure computation device of the embodiment.

The original data fragment $\alpha_i$ transferred from the relay device 32 is received by the communication unit 331-$i$ of the secure computation device 33-$i$ (FIG. 4) (FIGS. 7, 9, and 11: Step S1301-$i$) and temporarily stored in the temporary storage 333-$i$ (Step S3302-$i$). The reflection manager 334-$i$ judges whether or not the original data fragment $\alpha_i$ has been successfully stored (reflected) in the temporary storage 333-$i$ (Step S3303-$i$). Here, if it is judged that the original data fragment $\alpha_i$ has been successfully stored in the temporary storage 333-$i$, the reflection manager 334-$i$ transmits, to the communication unit 331-$i$, a reflection result (information indicating "successful reflection") to the effect that reflection has been successfully performed, and the communication unit 331-$i$ sends this reflection result (successful reflection) to the relay device 32 via the network 152 (Step S3304-$i$). On the other hand, if it is judged that the original data fragment $\alpha_i$ has been unsuccessfully stored in the temporary storage 333-$i$, the reflection manager 334-$i$ transmits, to the communication unit 331-$i$, a reflection result (information indicating "unsuccessful reflection") to the effect that reflection has been unsuccessfully performed, and the communication unit 331-$i$ sends this reflection result (unsuccessful reflection) to the relay device 32 via the network 152 (Step S3311-$i$).

The reflection result (successful reflection or unsuccessful reflection) is received by the communication unit 3221 of the relay device 32 (FIG. 3) and transmitted to the registration manager 3232 (FIG. 6: Step S3206). The registration manager 3232 judges whether or not the reflection result transmitted thereto indicates successful reflection (Step S3207).

Here, if it is judged that the reflection result transmitted thereto indicates successful reflection (successful reflection), the registration manager 3232 judges whether all the original data fragments $\alpha_1, \ldots, \alpha_N$ have been transferred to the secure computation devices 33-1, ..., 33-N (Step S1208). Here, if all the original data fragments $\alpha_1, \ldots, \alpha_N$ have not been transferred yet, the procedure goes back to Step S1205. On the other hand, if all the original data fragments $\alpha_1, \ldots, \alpha_N$ have been transferred, the registration manager 3232 stores the log created up to that time (at least the log created from when the relay device 32 accepted the original data fragments $\alpha_1, \ldots, \alpha_N$ to when the relay device 32 outputted the original data fragments $\alpha_1, \ldots, \alpha_N$ to all the secure computation devices 33-1 to 33-N) in the log storage 3235 (FIGS. 6 and 9: Step S3209). Next, the registration manager 3232 transmits a commit request to the communication unit 3221. The communication unit 3221 sends the commit request to each secure computation device 33-$i$ via the network 152 (FIGS. 6 and 10: Step S3210).

The commit request is received by the communication unit 331-$i$ of each secure computation device 33-$i$ (FIG. 4) and transmitted to the reflection manager 334-$i$. The reflection manager 334-$i$ to which the commit request has been transmitted (FIG. 7: Steps S33054 and S3306-$i$) saves, in the storage 135-$i$, the original data fragment $\alpha_i$ temporarily stored in the temporary storage 333-$i$ (FIGS. 7 and 10: Step S1307-$i$). Then, the reflection manager 334-$i$ transmits a commit completion notification to the communication unit 331-$i$, and the communication unit 331-$i$ sends the commit completion notification to the relay device 32 via the network 152 (Step S3308-$i$).

Figure 10:
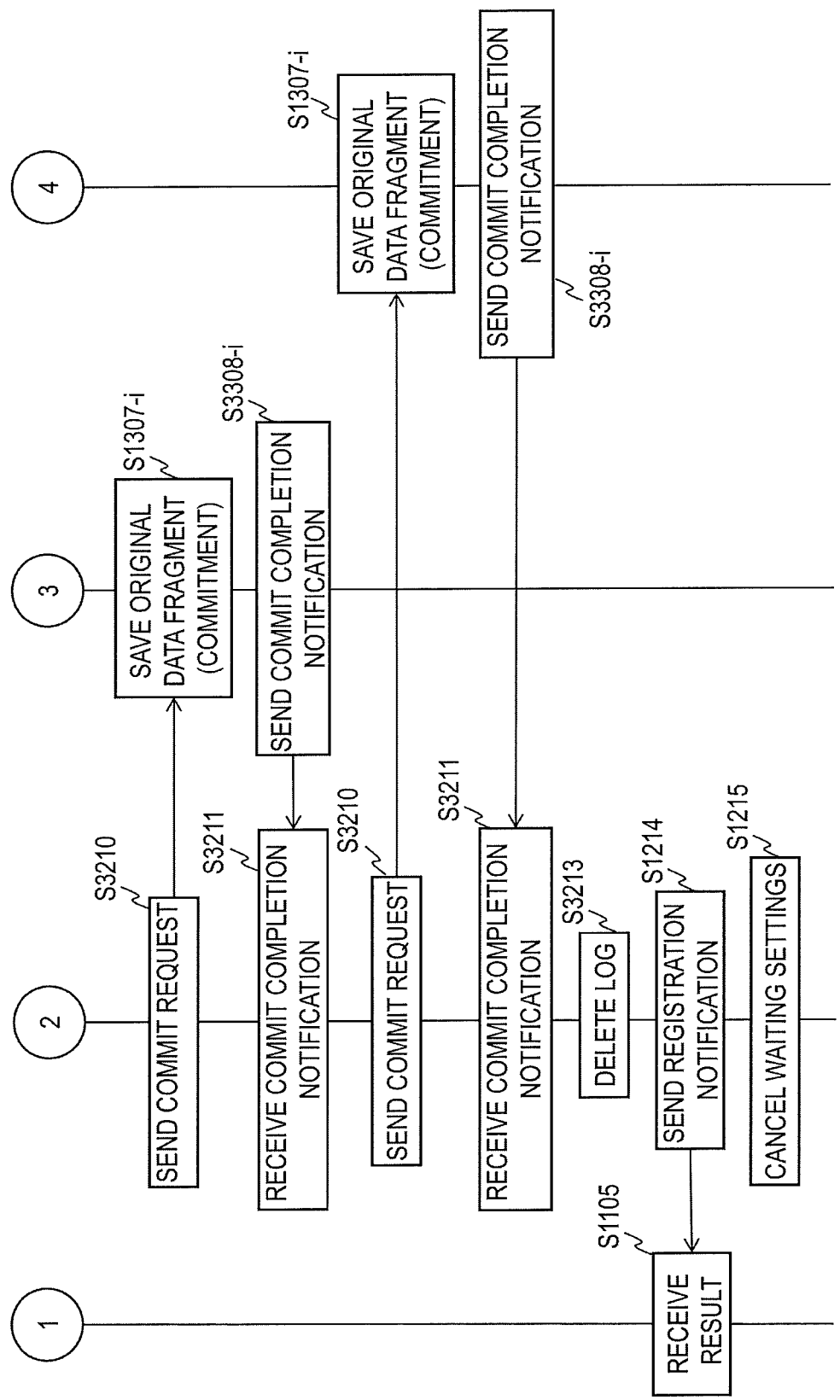
FIG. 10 is a sequence diagram for explaining a specific example of the registration processing (under normal conditions) of the third embodiment.

The commit completion notification is received by the communication unit 3221 of the relay device 32 (FIG. 3) and transmitted to the registration manager 3232 (FIGS. 6 and 10: Step S3211). The registration manager 3232 judges whether the commit completion notification has been transmitted from all the secure computation devices 33-1 to 33-N (Step S3212). Here, if at least some commit completion notifications have not been transmitted, the registration manager 3232 waits for all the commit completion notifications. On the other hand, if the commit completion notification has been transmitted from all the secure computation devices 33-1 to 33-N, the registration manager 3232 deletes the log from the log storage 3235 (Step S3213). Then, the processing in Steps S1214 and S1215 described in the first embodiment is executed.

On the other hand, if it is judged in Step S3207 (FIG. 6) that the reflection result indicates unsuccessful reflection (unsuccessful reflection), the registration manager 3232 stores the log created up to that time (at least the log created from when the relay device 32 accepted the original data fragments $\alpha_1, \ldots, \alpha_N$ to when the relay device 32 outputted the original data fragment to any secure computation device 33-$i$) in the log storage 3235 (FIGS. 6 and 11: Step S3216). Next, the registration manager 3232 transmits a rollback request to the communication unit 3221. The communication unit 3221 sends the rollback request to each secure computation device 33-$i$ via the network 152. At this time, the communication unit 3221 may not send the rollback request to the secure computation device 33-$i$ on which a judgment to the effect that the reflection result indicates unsuccessful reflection has been made (Step S3217).

The rollback request is received by the communication unit 331-$i$ of each secure computation device 33-$i$ (FIG. 4) and transmitted to the reflection manager 334-$i$. The reflection manager 334-$i$ to which the rollback request has been transmitted (FIG. 7: Step S3305-$i$) deletes (performs rollback on) the original data fragment $\alpha_i$ temporarily stored in the temporary storage 333-$i$ (Step S3309-$i$). Then, the reflection manager 334-$i$ transmits a rollback completion notification to the communication unit 331-$i$, and the communication unit 331-$i$ sends the rollback completion notification to the relay device 32 via the network 152 (Step S3310-$i$).

The rollback completion notification is received by the communication unit 3221 of the relay device 32 (FIG. 3) and transmitted to the registration manager 3232 (FIGS. 6 and 12: Step S3218). The registration manager 3232 judges whether the rollback completion notification has been transmitted from all the secure computation devices 33-$i$ to which the rollback request has been sent (Step S3219). Here, if at least some rollback completion notifications have not been transmitted, the registration manager 3232 waits for another rollback completion notification. On the other hand, if the rollback completion notification has been transmitted from all the secure computation devices 33-$i$ to which the rollback request has been sent, the registration manager 3232 deletes the log from the log storage 3235 (Step S3220). Then, the registration manager 3232 transmits an error notification to the communication unit 3211, and the communication unit 3211 transmits the error notification to the registration device 11 (Step S3221). Then, the processing in Step S1215 described in the first embodiment is executed.

<Feature of the Present Embodiment>

Also in the present embodiment, the relay device 32 is disposed in the communication paths between the registration device 11 and the secure computation devices 33-1 to 33-N and between the analyzing device 14 and the secure computation devices 33-1 to 33-N, and transaction management is performed. As a result, irrespective of timing with which each processing operation is started, a correct analysis result can be obtained. By performing the transaction control using two-phase commit, it is possible to continue service without the need for a hand even when part of the registration processing of the original data fragments failed.

Moreover, the relay device 32 of the present embodiment stores the log from when the relay device 32 accepted the original data fragments to when the relay device 32 outputted the original data fragments to the secure computation devices 33-$i$ (Step S3209), and deletes the log if all the to original data fragments have been correctly reflected in the secure computation devices 33-$i$ (Step S3213) and deletes the log after cancellation of the original data fragments is completed in all the secure computation devices 33-$i$ if any original data fragment has not been correctly reflected in the secure computation device 33-$i$ (Step S3221). As a result, even when a malfunction occurs in the relay device 32 during the registration processing, it is possible to know the progress of the registration processing by checking the log and save the storage capacity by deleting the log when the log becomes unnecessary.

Incidentally, in the third embodiment, the example in which the transaction control and log management using two-phase commit are applied to the first embodiment has been described. However, the above-described transaction control and log management using two-phase commit may be applied to the second embodiment. That is, each of the original data fragments of the third embodiment may be the cipher text obtained by encrypting each of the secret sharing values such that decoding is possible in each of the secure computation devices and/or each of the result fragments may be the cipher text obtained by encrypting each of the secure computation results such that decoding is possible in the analyzing device. The processing of encrypting and decoding the secret sharing values and the secure computation results is the same as that described in the second embodiment.

[Other Modifications Etc.]

Incidentally, the present invention is not limited to the above-described embodiments. For example, instead of making each device exchange information via a network, at least some sets of devices may exchange information via a portable recording medium. Alternatively, at least some sets of devices may exchange information via a non-portable recording medium. That is, a combination of some of these devices may be the same device. Moreover, there may be a plurality of registration devices or analyzing devices which are relayed by a relay device. Also in this case, the processing of the relay device may be the same as that of each embodiment described above.

The above-described various kinds of processing may be executed, in addition to being executed in chronological order in accordance with the descriptions, in parallel or individually depending on the processing power of a device that executes the processing or when needed. In addition, it goes without saying that changes may be made as appropriate without departing from the spirit of the present invention.

When the above-described configurations are implemented by a computer, the processing details of the functions supposed to be provided in each device are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the recording device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

In the above-described embodiments, processing functions of the present device are implemented as a result of a predetermined program being executed on the computer, but at least part of these processing functions may be implemented by hardware.

DESCRIPTION OF REFERENCE NUMERALS 1 to 3 secure computation system
11, 21 registration device
12, 32 relay device
13-$i$, 23-$i$, 33-$i$ secure computation device
14, 24 analyzing device

What is claimed is:

1. A relay device comprising processing circuitry configured to implement:

a first communication unit that receives a plurality of original data fragments which are a plurality of secret sharing values of original data from a registration device, and transfers the original data fragments to a plurality of secure computation devices to store the original data fragments temporarily in temporary storages of the secure computation devices which further include main storages storing target data fragments;

a second communication unit that receives requests to send result fragments which are secure computation results obtained, without reconstructing target data nor a computation result, by secure computation using any of the target data fragments which are transferred from the registration device and stored in the main storages of the secure computation devices, and transfers the requests to the secure computation devices, where the target data fragments are secret sharing values of the target data and the result fragments are secret sharing values of the computation result;

a third communication unit that receives the result fragments from the secure computation devices, and transfers the result fragments to an analyzing device; and a transaction manager that controls timing with which the original data fragments are transferred and timing with which the requests are transferred, wherein the transaction manager makes, without reconstructing the original data, a first decision that any one of the original data fragments is not correctly stored in any one of the temporary storages of the secure computation devices, or a second decision that all of the original data fragments are correctly stored in the temporary storages of the secure computation devices, in response to the first decision, the transaction manager provides all the secure computation devices with rollback requests to cancel the original data fragments which had been temporarily stored in the temporary storages of the secure computation devices without storing the original data fragments into the main storages of the secure computation devices for keeping the target data fragments as previous original data fragments which are secret sharing values of previous original data without reconstructing the target data, otherwise, in response to the second decision, the transaction manager provides all the secure computation devices with commit requests to store the original data fragments which had been stored in the temporary storages into the main storages of the secure computation devices for setting the original data fragments as the target data fragments without reconstructing the target data, wherein the result fragments are obtained by the secure computation using any of the target data fragments, without reconstructing the target data nor the computation result, after the response to the first decision or the second decision by the transaction manager.

2. The relay device according to claim 1, wherein when transfer of the original data fragments to the plurality of secure computation devices from the first communication unit is started, the transaction manager suspends transfer of the requests to the plurality of secure computation devices from the second communication unit until the transfer of all of the original data fragments is completed, and when transfer of the requests to the plurality of secure computation devices from the second communication unit is started, the transaction manager suspends transfer of the original data fragments to the plurality of secure computation devices from the first communication unit until the transfer of all of the result fragments for the requests is completed.

3. The relay device according to claim 2, wherein
the first communication unit receives a plurality of second original data fragments which are a plurality of secret sharing values of second original data from the registration device, and transfers the second original data fragments to the secure computation devices to store the second original data fragments in the secure computation devices,
the second communication unit receives second requests to send second result fragments which are secure computation results obtained by secure computation using any of the second original data fragments which are transferred from the registration device and stored in the secure computation devices, and transfers the second requests to the secure computation devices,
the third communication unit transfers the second result fragments, and
when transfer of the original data fragments to the plurality of secure computation devices from the first communication unit is started, the transaction manager suspends transfer of the second original data fragments to the plurality of secure computation devices from the second communication unit until the transfer of the original data fragments is completed.

4. The relay device according to claim 1, wherein
the first communication unit receives a plurality of second original data fragments which are a plurality of secret sharing values of second original data from the registration device, and transfers the second original data fragments to the secure computation devices to store the second original data fragments in the secure computation devices,
the second communication unit receives second requests to send second result fragments which are secure computation results obtained by secure computation using any of the second original data fragments which are transferred from the registration device and stored in the secure computation devices, and transfers the second requests to the secure computation devices,
the third communication unit transfers the second result fragments, and
when transfer of the original data fragments to the plurality of secure computation devices from the first communication unit is started, the transaction manager suspends transfer of the second original data fragments to the plurality of secure computation devices from the second communication unit until the transfer of all of the original data fragments is completed.

5. A secure computation system comprising:
a registration device;
a relay device;
an analyzing device; and
a plurality of secure computation devices, wherein
the registration device includes processing circuitry configured to send, to the relay device, a plurality of original data fragments which are plurality of secret sharing values of original data,
the relay device includes processing circuitry configured to receive the original data fragments from the registration device, and transfer the original data fragments to the secure computation devices to store the original data fragments temporarily in temporary storages of the secure computation devices which further include main storages storing target data fragments,
the analyzing device includes processing circuitry configured to send, to the relay device, requests to send result fragments which are secure computation results obtained, without reconstructing target data nor a computation result, by secure computation using any of the target data fragments which are transferred from the registration device and stored in the main storages of the secure computation devices, where the target data fragments are secret sharing values of the target data and the result fragments are secret sharing values of the computation result,
the relay device includes processing circuitry configured to receive the requests from the analyzing device, and transfer the requests to the secure computation devices,
the secure computation devices include processing circuitries configured to send the result fragments for the requests to the relay device,
the relay device includes processing circuitry configured to receive the result fragments from the secure computation devices, and transfer the result fragments to the analyzing device,
the relay device includes processing circuitry configured to control timing with which the original data fragments are transferred and timing with which the request to send is transferred, wherein
the relay device makes, without reconstructing the original data, a first decision that any one of the original data fragments is not correctly stored in any one of the temporary storages of the secure computation devices, or a second decision that all of the original data fragments are correctly stored in the temporary storages of the secure computation devices,
in response to the first decision, the relay device provides all the secure computation devices with rollback requests to cancel the original data fragments which had been temporarily stored in the temporary storages of the secure computation devices without storing the original data fragments in the main storages of the secure computation devices for keeping the target data fragments as previous original data fragments which are secret sharing values of previous original data without reconstructing the target data,
otherwise, in response to the second decision, the relay device provides all the secure computation devices with commit requests to store the original data fragments which had been stored in the temporary storages into the main storages of the secure computation devices for setting the original data fragments as the target data fragments without reconstructing the target data, wherein
the result fragments are obtained by the secure computation using any of the target data fragments, without reconstructing the target data nor the computation result, after the response to the first decision or the second decision by the transaction manager.

6. The secure computation system according to claim 5, wherein
when transfer of the original data fragments to the plurality of secure computation devices from the relay device is started, the transaction manager suspends transfer of the requests to the plurality of secure computation devices from the relay device until the transfer of all of the original data fragments is completed, and
when transfer of the requests to the plurality of secure computation devices from the relay device is started, the transaction manager suspends transfer of the original data fragments to the plurality of secure computation devices from the relay device until the transfer of all of the result fragments for the requests is completed.

7. The secure computation system according to claim 5, wherein
the relay device receives a plurality of second original data fragments which are a plurality of secret sharing values of second original data from the registration device, and transfers the second original data fragments to the secure computation devices to store the second original data fragments in the secure computation devices,
the relay device receives second requests to send second result fragments which are secure computation results obtained by secure computation using any of the second original data fragments which are transferred from the registration device and stored in the secure computation devices, and transfers the second requests to the secure computation devices,
the relay device transfers the second result fragments, and
when transfer of the original data fragments to the plurality of secure computation devices from the relay device is started, the transaction manager suspends transfer of the second original data fragments to the plurality of secure computation devices from the relay device until the transfer of all of the original data fragments is completed.

8. A method which is executed by a relay device comprising:
receiving a plurality of original data fragments which are a plurality of secret sharing values of original data from a registration device, and transferring the original data fragments to a plurality of secure computation devices to store the original data fragments temporarily in temporary storages of the secure computation devices which further include main storages storing target data fragments;
receiving requests to send result fragments which are secure computation results obtained, without reconstructing target data nor a computation result, by secure computation using any of the target data fragments which are transferred from the registration device and stored in the main storages of the secure computation devices, and transferring the requests to the secure computation devices, where the target data fragments are secret sharing values of the target data and the result fragments are secret sharing values of the computation result;
receiving the result fragments from the secure computation devices, and transferring the result fragments to an analyzing device; and
controlling timing with which the original data fragments are transferred and timing with which the requests are transferred, wherein
the relay device makes, without reconstructing the original data, a first decision that any one of the original data fragments is not correctly stored in any one of the temporary storages of the secure computation devices, or a second decision that all of the original data fragments are correctly stored in the temporary storages of the secure computation devices,
in response to the first decision, the relay device provides all the secure computation devices with rollback requests to cancel the original data fragments which had been temporarily stored in the temporary storages of the secure computation devices without storing the original data fragments into the main storages of the secure computation devices for keeping the target data fragments as previous original data fragments which are secret sharing values of previous original data without reconstructing the target data,
otherwise, in response to the second decision, the relay device provides all the secure computation devices with commit requests to store the original data fragments which had been stored in the temporary storages into the main storages of the secure computation devices for setting the original data fragments as the target data fragments without reconstructing the target data, wherein
the result fragments are obtained by the secure computation using any of the target data fragments, without reconstructing the target data nor the computation result, after the response to the first decision or the second decision by the transaction manager.

9. The method according to claim 8, wherein
when transfer of the original data fragments to the plurality of secure computation devices from the relay device is started, the relay device suspends transfer of the requests to the plurality of secure computation devices from the relay device until the transfer of all of the original data fragments is completed, and
when transfer of the requests to the secure computation device from the relay device is started, the transaction manager suspends transfer of the original data fragments to the plurality of secure computation devices from the relay device until the transfer of all of the result fragments for the requests is completed.

10. The method according to claim 8, wherein
receiving a plurality of second original data fragments which are a plurality of secret sharing values of second original data from the registration device, and transferring the second original data fragments to the secure computation devices to store the second original data fragments in the secure computation devices,
receiving second requests to send second result fragments which are secure computation results obtained by secure computation using any of the second original data fragments which are transferred from the registration device and stored in the secure computation devices, and transferring the second requests to the secure computation devices,
transferring the second result fragments, and
when transfer of the original data fragments to the plurality of secure computation devices from the relay device is started, the relay device suspends transfer of the second original data fragments to the plurality of secure computation devices from the relay device until the transfer of all of the original data fragments is completed.

11. A non-transitory computer-readable recording medium storing a program for making a computer function as a relay device comprising processing circuitry configured to implement:
a first communication unit that receives a plurality of original data fragments which are a plurality of secret sharing values of original data from a registration device, and transfers the original data fragments to a plurality of secure computation devices to store the original data fragments temporarily in temporary storages of the secure computation devices which further include main storages storing target data fragments;
a second communication unit that receives requests to send result fragments which are secure computation results obtained, without reconstructing target data nor a computation result, by secure computation using any of the target data fragments which are transferred from the registration device and stored in the main storages of the secure computation devices, and transfers the requests to the secure computation devices, where the target data fragments are secret sharing values of the target data and the result fragments are secret sharing values of the computation result;

a third communication unit that receives the result fragments from the secure computation devices, and transfers the result fragments to an analyzing device; and a transaction manager that controls timing with which the original data fragments are transferred and timing with which the requests are transferred, wherein the transaction manager makes, without reconstructing the original data, a first decision that any one of the original data fragments is not correctly stored in any one of the temporary storages of the secure computation devices, or a second decision that all of the original data fragments are correctly stored in the temporary storages of the secure computation devices, in response to the first decision, the transaction manager provides all the secure computation devices with rollback requests to cancel the original data fragments which had been temporarily stored in the temporary storages of the secure computation devices without storing the original data fragments into the main storages of the secure computation devices for keeping the target data fragments as previous original data fragments which are secret sharing values of previous original data without reconstructing the target data, otherwise, in response to the second decision, the transaction manager provides all the secure computation devices with commit requests to store the original data fragments which had been stored in the temporary storages into the main storages of the secure computation devices for setting the original data fragments as the target data fragments without reconstructing the target data, wherein the result fragments are obtained by the secure computation using any of the target data fragments, without reconstructing the target data nor the computation result, after the response to the first decision or the second decision by the transaction manager.

12. The non-transitory computer-readable recording medium according to claim 11, wherein when transfer of the original data fragments to the plurality of secure computation devices from the first communication unit is started, the transaction manager suspends transfer of the requests to the plurality of secure computation devices from the second communication unit until the transfer of all of the original data fragments is completed, and when transfer of the requests to the secure computation device from the second communication unit is started, the transaction manager suspends transfer of the original data fragments to the plurality of secure computation devices from the first communication unit until the transfer of all of the result fragments for the requests is completed.

13. The non-transitory computer-readable recording medium according to claim 11, wherein the first communication unit receives a plurality of second original data fragments which are a plurality of secret sharing values of second original data from the registration device, and transfers the second original data fragments to the secure computation devices to store the second original data fragments in the secure computation devices, the second communication unit receives second requests to send second result fragments which are secure computation results obtained by secure computation using any of the second original data fragments which are transferred from the registration device and stored in the secure computation devices, and transfers the second requests to the secure computation devices, the third communication unit transfers the second result fragments, and when transfer of the original data fragments to the plurality of secure computation devices from the first communication unit is started, the transaction manager suspends transfer of the second original data fragments to the plurality of secure computation devices from the second communication unit until the transfer of all of the original data fragments is completed.

* * * * *